United States Patent
Zhuang et al.

(10) Patent No.: US 11,363,629 B2
(45) Date of Patent: Jun. 14, 2022

(54) METHOD, APPARATUS AND SYSTEM FOR MEDIUM ACCESS CONTROL

(71) Applicants: Huawei Technologies Canada Co., Ltd., Kanata (CA); Xuemin Shen, Waterloo (CA); Weihua Zhuang, Waterloo (CA); Jie Gao, Kitchener (CA)

(72) Inventors: Weihua Zhuang, Waterloo (CA); Jie Gao, Kitchener (CA); Xuemin Shen, Waterloo (CA); Xu Li, Nepean (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 49 days.

(21) Appl. No.: 16/945,334

(22) Filed: Jul. 31, 2020

(65) Prior Publication Data

US 2022/0039153 A1 Feb. 3, 2022

(51) Int. Cl.
| | |
|---|---|
| H04W 74/08 | (2009.01) |
| H04W 74/04 | (2009.01) |
| H04W 72/04 | (2009.01) |
| H04W 74/00 | (2009.01) |

(52) U.S. Cl.
CPC ....... *H04W 74/04* (2013.01); *H04W 72/0446* (2013.01); *H04W 74/006* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 7,447,180 B2 | 11/2008 | Jeong et al. | |
| 10,397,953 B2 | 8/2019 | Kim et al. | |
| 2009/0323611 A1* | 12/2009 | Singh | H04W 74/0875 370/329 |
| 2019/0150198 A1* | 5/2019 | Sun | H04L 5/0032 370/329 |
| 2020/0146063 A1* | 5/2020 | Xu | H04L 5/0048 |
| 2020/0187204 A1 | 6/2020 | Alriksson et al. | |
| 2020/0229227 A1 | 7/2020 | Babael et al. | |

(Continued)

FOREIGN PATENT DOCUMENTS

| | | |
|---|---|---|
| EP | 3566530 A1 | 11/2019 |
| WO | 2019095246 A1 | 5/2019 |

*Primary Examiner* — Brandon M Renner

(57) ABSTRACT

A method, apparatus and system for medium access control is provided. Time slots configured to include mini slots at the beginnings thereof. Devices are assigned time slot, mini slot combinations as transmission opportunities. A device can attempt to use a transmission opportunity when it has a packet to send, by beginning data transmission in its assigned slot and mini slot and potentially continuing the transmission up until the end of the assigned slot. If another device is already transmitting in the assigned slot, the device refrains from using its transmission opportunity. Higher priority devices can be assigned transmission opportunities corresponding to earlier mini slots within a slot. In some embodiments, multiple devices can be assigned the same transmission opportunity and a collision detection mechanism can be employed. In some embodiments, all devices detect if a slot is idle and advance the beginning of the next slot upon such detection.

20 Claims, 20 Drawing Sheets

(56) References Cited

U.S. PATENT DOCUMENTS

| | | | |
|---|---|---|---|
| 2020/0275484 A1* | 8/2020 | Xu | H04W 72/042 |
| 2020/0296591 A1* | 9/2020 | Alriksson | H04B 7/0413 |
| 2020/0314881 A1* | 10/2020 | Bagheri | H04L 5/10 |
| 2021/0045153 A1* | 2/2021 | Zhang | H04L 27/0006 |
| 2021/0168759 A1* | 6/2021 | Pan | H04W 68/00 |
| 2021/0274540 A1 | 9/2021 | Lee et al. | |
| 2021/0337540 A1* | 10/2021 | Yerramalli | H04W 74/0808 |
| 2021/0400732 A1* | 12/2021 | Xue | H04W 72/04 |

* cited by examiner

METHOD, APPARATUS AND SYSTEM FOR MEDIUM ACCESS CONTROL

CROSS REFERENCE TO RELATED APPLICATIONS

This is the first application for this invention.

FIELD OF THE INVENTION

The present invention pertains to the field of data communications and, in particular, to a method, apparatus and system for medium access control in a system for example which subdivides time into slots and further subdivides the slots into mini slots.

BACKGROUND

In communication systems, particularly wireless communication systems but also wired and optical communication systems, multiple devices often utilize a shared resource, such as an over-the-air radio frequency band, for communication. There are a variety of existing protocols for sharing such resources, many of which can be characterized as fully centralized or fully distributed. Such protocols can be referred to as medium access control (MAC) protocols. A fully centralized protocol relies on a central scheduler to define designated transmission times. Each device is restricted to transmit only at its designated times, and the designated times are defined in such a way that no transmit collisions occur between devices. A fully distributed protocol excludes the central scheduler and instead allows each device to schedule its own transmissions independently. Because collisions are possible, such protocols typically include a retransmission or collision resolution mechanism. Distributed protocols can employ some forms of explicit or implicit coordination, for example in the case of carrier sense multiple access protocols.

Different MAC protocols are useful in different situations. As such, it is still useful to design new MAC protocols that take into account particular operating scenarios and particular device capabilities. For example, in an industrial internet of things (IoT) environment, a large number of devices in a limited area may be enabled with wireless communication capabilities to facilitate factory automation. Traffic arrival rates in such scenarios can be relatively high. Some of these devices may require high reliability and low-latency communication connections, for example when critical machinery is being controlled. Different devices can have different reliability and delay tolerances that need to be accommodated. Additionally, cost and complexity considerations dictate that MAC protocols should not rely on advanced physical-layer techniques and should not lead to high control overhead.

Therefore, there is a need for a method, apparatus and system for medium access control that obviates or mitigates one or more limitations of the prior art.

SUMMARY OF THE INVENTION

An object of embodiments of the present invention is to provide a method, apparatus and system for shared medium access control. Each of an access point, an end device, and a system including one or more access points, end devices, or a combination thereof, as well as associate methods, are provided for. The methods, apparatus and systems are configured to implement a MAC protocol which defines successive time slots. The time slots include multiple mini slots at least at the beginnings thereof. The access point can operate as a scheduler or controller. The access point (or another scheduling device) can assign slots and mini slots to devices as transmission opportunities, and the devices can use the transmission opportunities when they have data to transmit. A device can begin its transmission in an assigned mini slot and continue this transmission potentially until the end of the slot in which the mini slot occurs. Devices are also configured to detect whether there is a transmission already occurring by another device before beginning transmission in an assigned mini slot, and to avoid transmitting upon such a detection. Accordingly, devices can be given higher priority by assigning them to earlier mini slots within a given slot, because in such a case their transmission opportunity will be less likely to be pre-empted by another device transmission. This prioritization can be used to accommodate devices with low latency or high reliability requirements, for example. A technical advantage of such embodiments is that shared channel access with support for device prioritization is enabled. A further technical advantage is that such shared channel access with support for device prioritization is enabled in a manner which is at least partially decentralized, because devices monitor the shared channel before transmitting, thus coordinating amongst themselves which devices should transmit in a given slot. A further technical advantage is that centralized control of spectrum access is maintained to a degree, because a scheduler can designate transmission opportunities and allow higher priority devices to have preferred transmission opportunities and thus improved delay/latency performance (i.e. reducing delay/latency).

In some embodiments, as devices do not necessarily transmit at each transmission opportunity, the same slot and mini slot may be assigned as a transmission opportunity for multiple devices. In such a case, a collision resolution mechanism may also be provided for. A technical advantage of such embodiments is that spectral efficiency can be improved when devices only transmit messages in an assigned slot with a limited probability less than one.

In various embodiments, in addition to or separately from the above-described mini slot assignment protocol, devices, the access point (or other scheduler), or both, can be configured to detect when a particular time slot (also referred to herein simply as a "slot") is not being used for a transmission. In such cases, the devices (and access point) can be configured to advance the beginning of a next time slot. That is, the devices and access point do not necessarily have to wait for the end of the current time slot before beginning the next time slot. This can be performed in a consistent manner across devices (and the access point), so that slot synchronicity is maintained. A technical advantage of such embodiments is that idle shots are shortened, thereby improving spectral efficiency. Another technical advantage is that this improved spectral efficiency is potentially achieved in a fully or partially distributed manner, thereby reducing control overhead.

In accordance with embodiments of the present invention, there is provided a device in a communication network. The device may be a wireless device, such as but not necessarily limited to a user equipment (UE) or an industrial or non-industrial IoT device. The device includes a transmitter, a receiver and controlling electronics. The device is configured to operate in accordance with the above-described MAC protocol. In particular, the device is configured to receive a schedule indicating a transmission opportunity on a shared channel for the device. The schedule can be received via unicast message (or broadcast message) for example from an access point or scheduler device, which transmits the schedule via one or more scheduling messages. The transmission opportunity corresponds to a mini slot forming part of a time slot, and the mini slot and the time slot is specified by the schedule. In various embodiments, when the device selects to use the transmission opportunity (e.g. by virtue of having data to transmit), the device is configured to perform following actions. If it is determined that the specified mini slot is a first mini slot of all mini slots in the specified time slot, the device is configured to transmit the data using the shared channel, e.g. without further conditions. If it is determined that the specified mini slot is after the first mini slot, the device is configured to: monitor a prior mini slot which is part of the time slot and which precedes the specified mini slot; and transmit the data using the shared channel upon detecting that the shared channel is idle during said prior mini slot. When, on the other hand, the channel is in use during the prior mini slot, the device refrains from transmitting the data using the shared channel during the current transmission opportunity. A technical advantage is that devices coordinate shared channel access amongst themselves, while still being responsive to scheduling, which can be used to prioritize devices and to allocate transmission opportunities as necessary to optimize the system.

In accordance with embodiments of the present invention, there is provided an access point in a communication network. The access point includes a transmitter, a receiver and controlling electronics. The access point is configured to transmit, via one or more scheduling messages, one or more schedules indicating a plurality of uplink transmission opportunities on a shared channel for a plurality of respective devices. Scheduling messages can include a broadcast message, unicast messages, or a combination thereof. Higher priority transmissions can be scheduled in earlier mini slots. Each transmission opportunity corresponds to a respective time slot and a respective mini slot forming part of that respective time slot. The access point is further configured to monitor the shared channel for transmissions from the plurality of devices according to the one or more schedules. Each of the plurality of devices is configured to use or refrain from using each transmission opportunity assigned thereto based at least in part on an internal condition, such as whether the device has a packet to transmit. One, some, and typically most or all of the transmissions begin in a particular mini slot of a time slot and continuing into an additional mini slot of said time slot. In some embodiments, the access point monitors for a first transmission according to a first transmission opportunity beginning in an earlier mini slot of a particular slot. When the first transmission does not occur, the access point monitors for another transmission according to another transmission opportunity beginning in a later mini slot of the particular slot. When the first transmission does occur, the access point receives the first transmission, which may span multiple mini slots of the particular slot, potentially along with another part of the slot which follows the mini slots.

In accordance with embodiments of the present invention, there is provided a device in a communication network. The device includes a transmitter, a receiver and controlling electronics. The device is configured to monitor a shared, time-slotted communication channel at a time prior to an end of a current time slot in which transmissions are potentially scheduled. The device is configured, when the shared, time-slotted communication channel is idle at said time prior to the end of the current time slot, to commence an immediately next time slot at a particular time prior to the end of the current time slot.

In accordance with embodiments of the present invention, there is provided an access point in a communication network. The access point includes a transmitter, a receiver and controlling electronics. The access point is configured to monitor a shared, time-slotted communication channel at a time prior to an end of a current time slot in which uplink transmissions from one or more of a plurality of devices are scheduled. The access point is configured, when the shared, time-slotted communication channel is idle at said time prior to the end of the current time slot, to commence an immediately next time slot at a particular time prior to the end of the current time slot. The access point may further be configured, when the shared, time-slotted communication channel is idle at said time prior to the end of the current time slot, to transmit an indication to the plurality of devices that the immediately next time slot is to commence at the particular time prior to the end of the current time slot.

Embodiments of the present invention provide for methods and computer program products providing instructions for execution by a computer processor to implement such methods. In accordance with embodiments of the present invention, there is provided a method for medium access control. The method includes, by a device in a communication network: receiving a schedule indicating a transmission opportunity on a shared channel for the device, the transmission opportunity corresponding to a mini slot forming part of a time slot, the mini slot and the time slot specified by the schedule. The method further includes, when the device is to use the transmission opportunity to transmit data, the device performs following actions. If the specified mini slot is a first mini slot of all mini slots in the specified time slot, the device transmits the data using the shared channel. If the specified mini slot is after the first mini slot, the method further includes: monitoring a prior mini slot which is part of the time slot and which precedes the specified mini slot; and transmitting the data using the shared channel upon detecting that the shared channel is idle during said prior mini slot, and refraining from transmitting the data at the transmission opportunity otherwise.

In accordance with embodiments of the present invention, there is provided a method for medium access control. The method includes, by an access point in a communication network, transmitting, via one or more scheduling messages, one or more schedules indicating a plurality of uplink transmission opportunities on a shared channel for a plurality of respective devices, each transmission opportunity of the plurality corresponding to a respective time slot and a respective mini slot forming part of said respective time slot. The method further includes monitoring the shared channel for transmissions from the plurality of devices according to the one or more schedules, each of the plurality of devices configured to use or refrain from using each transmission opportunity assigned thereto based at least in part on an internal condition, at least one (and typically all) of the transmissions beginning in a particular mini slot of a time slot and continuing into a subsequent portion of the time slot, such as into one or more subsequent mini slots (if any) of the time slot.

In accordance with embodiments of the present invention, there is provided a method for medium access control. The method includes, by a device or an access point in a communication network, monitoring a shared, time-slotted communication channel at a time prior to an end of a current time slot in which transmissions are potentially scheduled.

The method further includes when the shared, time-slotted communication channel is idle at said time prior to the end of the current time slot, commencing an immediately next time slot at a particular time prior to the end of the current time slot.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention generally provide apparatus, systems and methods for medium access control, utilizing time subdivided into slots and the slots further subdivided into mini slots. Devices with higher priority can be assigned transmission opportunities in earlier mini slots of a time slot, and such transmission opportunities, if taken, will pre-empt transmission opportunities assigned to later mini slots of the same slot. A mechanism for synchronization sensing (and its related operation of slot re-synchronization) is also provided for, in which idle time slots are detected and truncated by all involved devices and access points. According to such a mechanism, when an idle time slot is detected, the beginning of the next time slot is advanced and begun at the same time by all the involved devices and access points. This potentially reduces transmission idle time.

Figure 1:
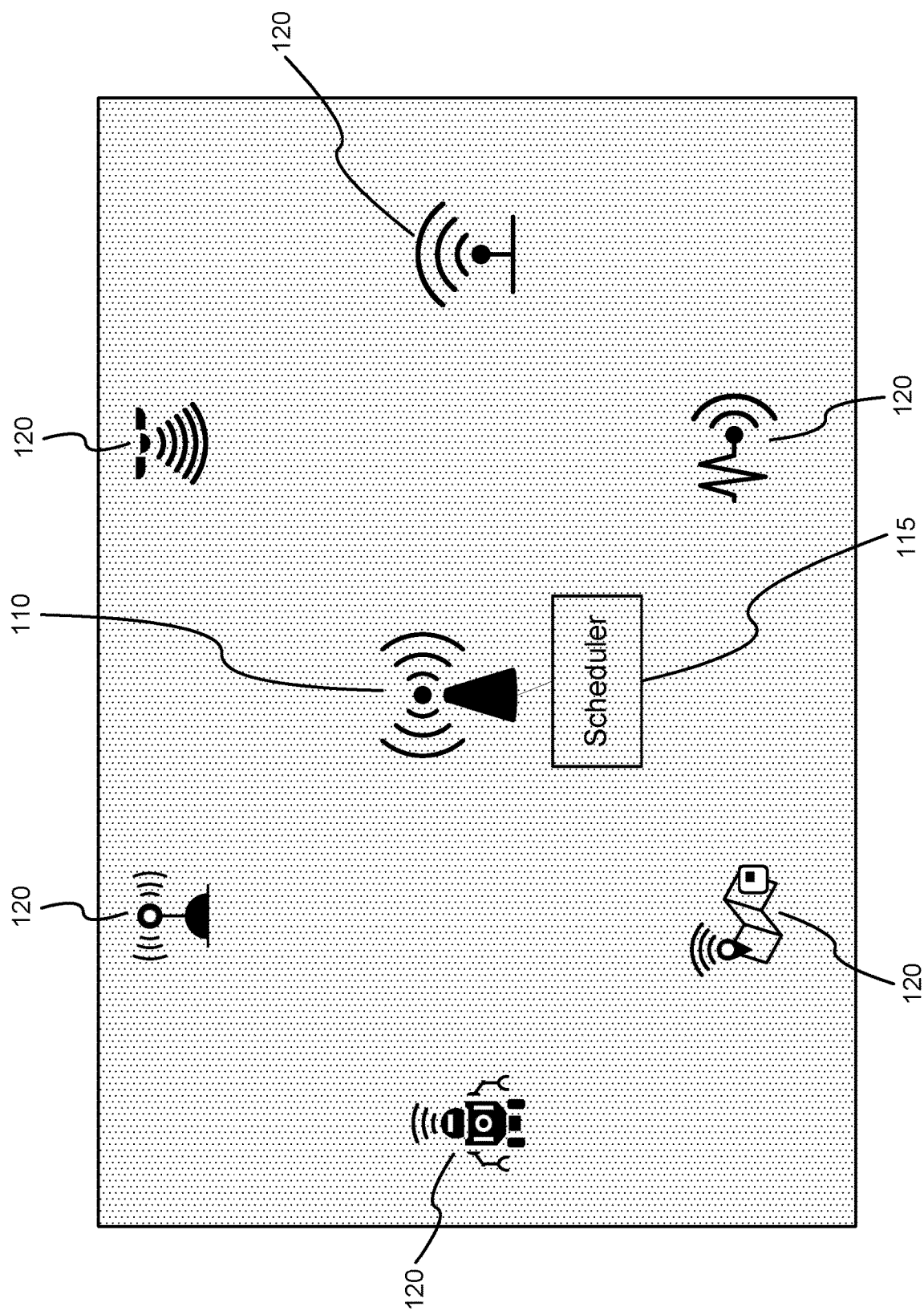
FIG. 1 illustrates a network scenario in accordance with some embodiments of the present invention.

FIG. 1 illustrates a network scenario in accordance with embodiments of the present invention. An access point 110 is communicatively, wirelessly coupled to a plurality of devices 120. The devices, which may be industrial IoT devices for example, transmit data to the access point via a shared, slotted channel. The access point may act as or include a scheduler 115 which designates transmission opportunities for the devices. The transmission opportunities are communicated to the devices for example by transmission from the access point. A centralized scheduler can thus be provided and configured to generate the schedule assigning specified slots and mini slots as transmission opportunities to designated devices. It is assumed that there is a single access point. However, multiple access points can be included for example by assigning each access point to a different set (or group) of devices. It can be assumed for simplicity that all devices are in transmission range of each other, however this is not necessarily a strict requirement in all embodiments. The devices receive a schedule indicative of transmission opportunities on the shared channel from the access point or another device transmitting schedules on behalf of the scheduler. The access point may coordinate transmission opportunities for devices at least in part by transmitting the schedule, for example periodically.

The information specified by the schedule includes mini slots and time slots assigned as transmission opportunities to corresponding designated devices. Therefore, the schedule may include an indication of one or more devices, and, corresponding to each device, one or more transmission opportunities for that device. The information specified by the schedule may include explicit information included in the schedule, or implicit information which indicates the information specified by the schedule, or a combination thereof. For example, the information may explicitly designate transmission opportunities corresponding to devices, or the information may designate certain parameters, operating conditions, or other information, which devices can interpret to obtain information regarding their transmission opportunities.

Figure 2:
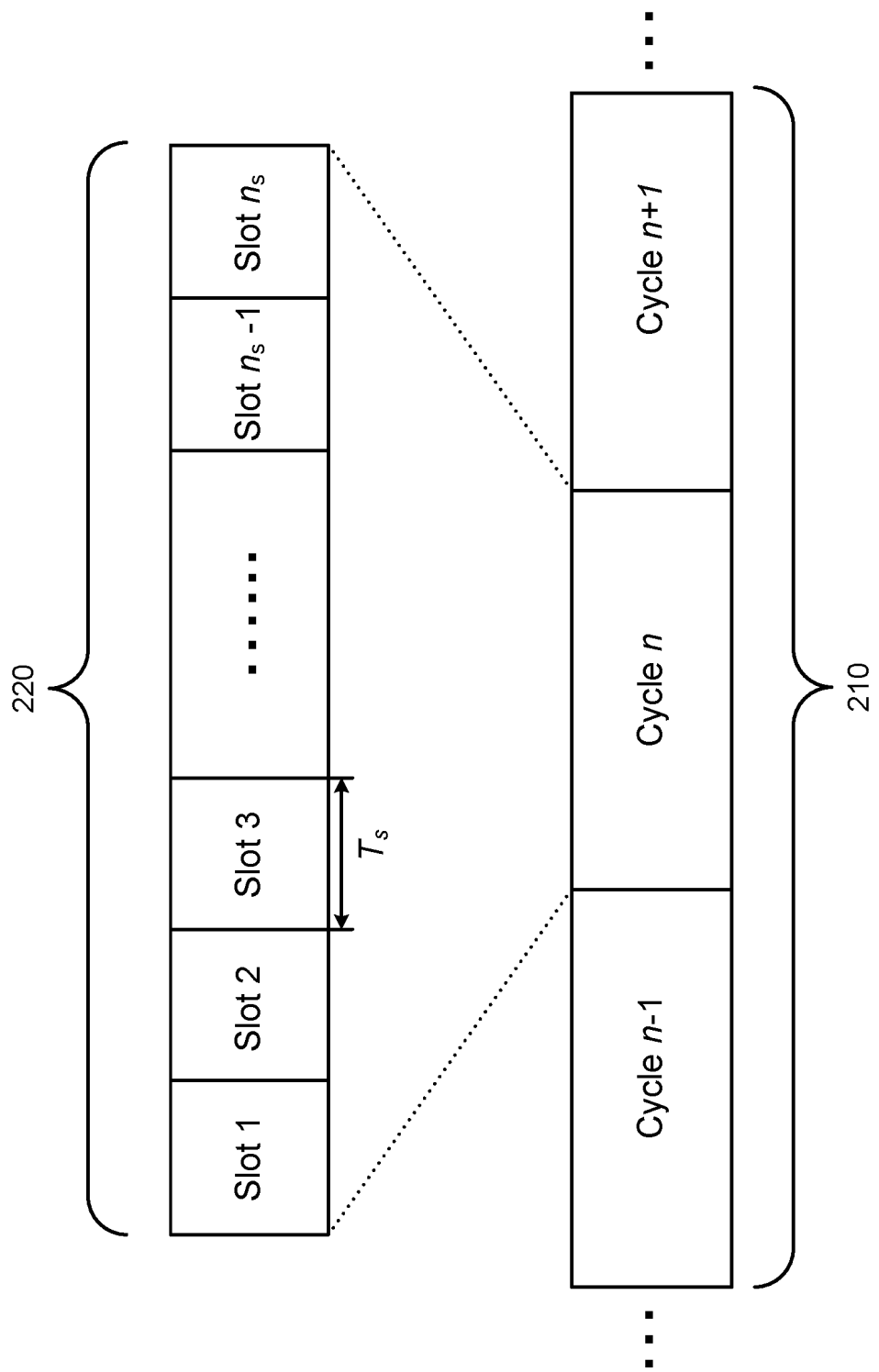
FIG. 2 illustrates a cycle structure and a slot structure according to an embodiment of the present invention.

FIG. 2 illustrates a cycle structure and a slot structure according to an embodiment of the present invention. Time is divided into cycles 210 and the cycles are subdivided into multiple slots 220, numbered from 1 to $n_s$. The time duration of each slot is $T_s$. The cycles allow for repetition of a transmission schedule multiple times. For example, a transmission schedule can assign specified slots and mini slots as transmission opportunities for specified devices. These transmission opportunities can recur in each cycle unless or until a new transmission schedule is provided. Accordingly, the time slots indicated in (or by) a schedule can occur repeatedly according to a cyclical pattern. This mitigates the requirement to re-transmit the schedule every $n_s$ slots. A technical advantage of using cycles is that assigned transmission opportunities can repeat. Therefore, the schedule can be relatively static and specify multiple transmission opportunities. This potentially reduces scheduling overhead because scheduling messages do not need to be transmitted often.

Timing of time slots and mini slots is synchronized across the devices using the shared channel, as well as with the access point. Accordingly, each device is aware of the timing of time slots and mini slots. Synchronization can be performed using a variety of methods, for example based on system information or timing beacons broadcast by the access point. Timing of time slots and mini slots may therefore be synchronized across a plurality of devices in the network as well as with an access point, where the access point coordinates transmission opportunities for the plurality of devices.

Figure 3:
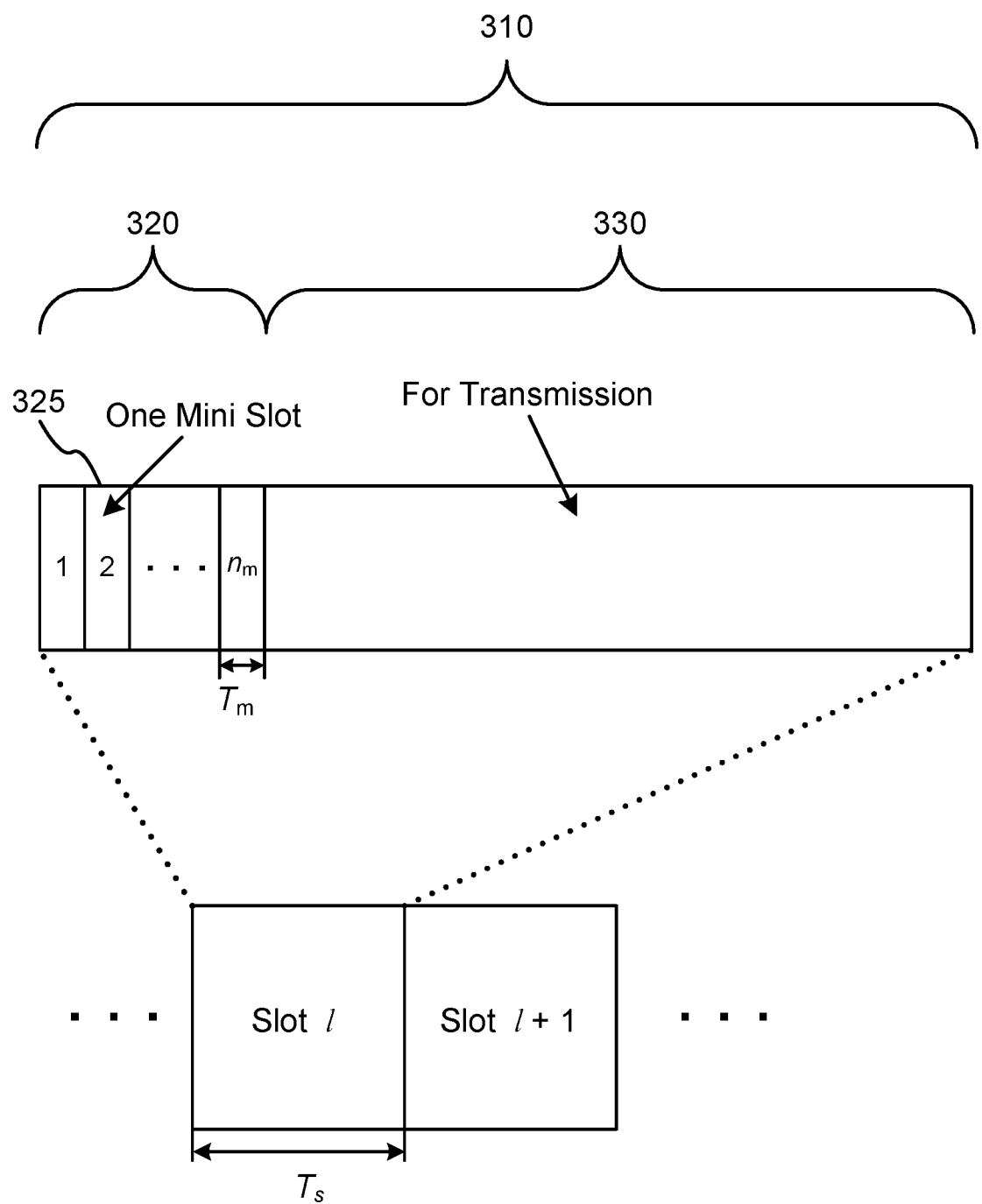
FIG. 3 illustrates the subdivision of a slot into a first part, which includes a plurality of mini slots, and a second part which is not subdivided into mini slots, in accordance with some embodiments of the present invention.

FIG. 3 illustrates the subdivision of a slot 310 into a first part 320, which includes a plurality of mini slots 325, and a second part 330 which is not subdivided into mini slots. Alternatively, in some embodiments, the length of the second part 330 is adjustable. The time duration of each mini slot is $T_m$ which is less than $T_s$.

In various embodiments, as illustrated in FIG. 3, each slot starts with a (e.g. fixed) number of mini slots, which may each be of equal length. Unless superposed mini slot assignment is adopted, each mini slot is assigned to one device. This is shown in more detail in FIG. 4. Each slot may be of sufficient length to accommodate one transmission. In some embodiments, each slot may be configured to accommodate at most one transmission. Accordingly, the mini slots correspond to pre-determined transmission opportunities for devices assigned to them, while typically one device will successfully obtain a transmission opportunity in each slot. Unlike existing works with mini slots, which use a mini slot as the minimum time unit for packet transmission, a slot may be the minimum time unit for packet transmission in embodiments of the present invention, while mini slots are used for sensing and determining channel occupancy. According to embodiments of the present invention, the probability that a slot is idle is reduced (and thus channel usage efficiency increases), because multiple devices can potentially use a slot without causing packet collision. Furthermore, different mini slots correspond to different transmission priorities, which provides support for diversified service requirements.

When a particular mini slot is assigned as a transmission opportunity to a device, that device is given the opportunity to begin a transmission using a shared channel in that mini slot. The transmission is not restricted to the mini slot but instead can (and typically is expected to) continue past the end of the mini slot and potentially up until the end of the slot in which the mini slot resides. For example, an end of the transmission can be configured to occur at or before an end of the time slot of the transmission opportunity. In some embodiments, devices are configured to end their transmissions before the end of the time slot in order to leave time for detecting coordinating signals, such as collision detection beacons. This is in contrast to other applications involving mini slots, in which a device is restricted to transmit only in its assigned mini slot. Accordingly, the time length of slots can be set so that it accommodates one transmission of typical length, rather than multiple transmissions. A technical advantage of this arrangement is that slot lengths can be shortened and shared by multiple devices, thus potentially improving transmission coordination and channel sharing.

Figure 4:
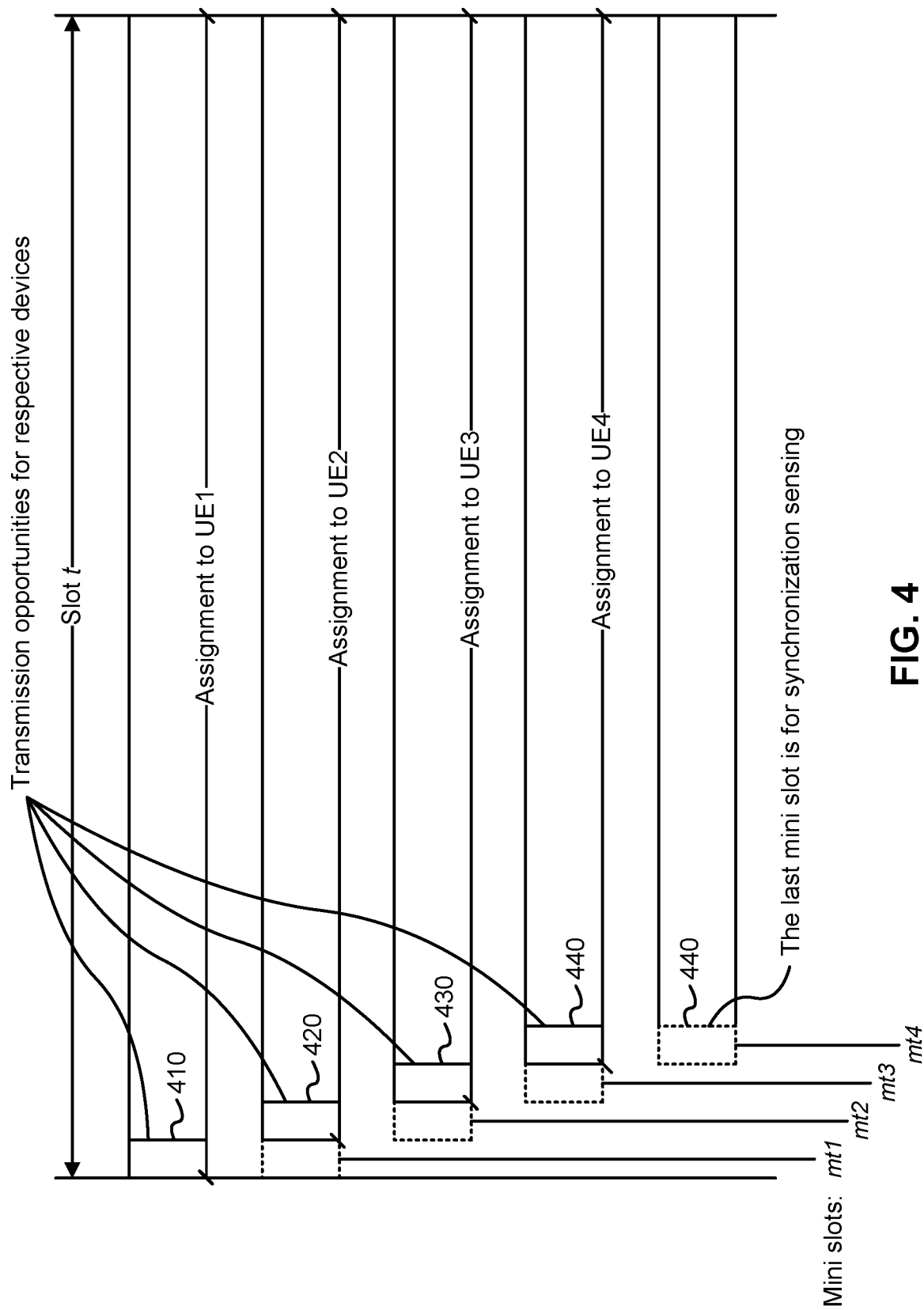
FIG. 4 illustrates an example of transmission opportunity assignment in a slot, in accordance with some embodiments of the present invention.

Accordingly, FIG. 4 illustrates mini slots assigned as transmission opportunities for four different devices, labelled (in the present example) UE1, UE2, UE3 and UE4. UE1 is assigned a transmission opportunity beginning in the first mini slot 410; UE2 is assigned a transmission opportunity beginning in the second mini slot 420; UE3 is assigned a transmission opportunity beginning in the third mini slot 430; and UE4 is assigned a transmission opportunity beginning in the fourth mini slot 440. It is assumed for simplicity that there are only four mini slots. UE1, having been assigned the first mini slot, can transmit data using the shared channel without further action, when it is to use the transmission opportunity to transmit data.

UE2, when it is to use the transmission opportunity to transmit data beginning in the second mini slot 420, is configured to monitor (or sense) the first mini slot 410 (i.e. the immediately preceding mini slot in the same slot) for transmission activity. Upon detecting or sensing that the shared channel is idle (due to UE1 not using its assigned transmission opportunity), UE2 can transmit data using the shared channel. Otherwise, upon detecting or sensing that the shared channel is in use (due to UE1 using its assigned transmission opportunity), UE2 will refrain from transmitting data so as to avoid a collision on the shared channel. Although the device is configured in the present embodiment to monitor (or sense) the immediately preceding mini slot to detect whether the channel is in use, it is considered that the device can, additionally, monitor (or sense) prior parts of the slot in other ways in order to detect whether the channel is idle. For example, the device can monitor (or sense) one or more other prior mini slots to determine whether or not the shared channel is idle. Monitoring and sensing are considered herein to be substantially equivalent operations, in which a device uses its receiver to detect radio activity.

Similarly, UE3 and UE4, when they are to use their respective transmission opportunities beginning in the third mini slot 430 and fourth mini slot 440, are configured to monitor the preceding (second mini slot 420 and third mini slot 430) for transmission activity. Upon detecting or sensing that the shared channel is idle (due to another UE not using its assigned transmission opportunity), UE3 or UE4 can transmit data using the shared channel. Otherwise, upon detecting that the shared channel is in use (due to another UE using its assigned transmission opportunity), UE3, UE4, or both, will refrain from transmitting data so as to avoid a collision on the shared channel.

A device can be configured to use or attempt to use a transmission opportunity for example based on an internal condition. For example, an internal condition is that the device has data to transmit. Other internal conditions can be, for example, that the device has data to transmit and a random or pseudo-random process indicates that the device is to use or attempt to use the transmission opportunity to transmit data.

Devices do not necessarily transmit at every transmission opportunity. A lower priority device may be assigned to a later mini slot while a higher priority device may be assigned to an earlier mini slot of the same slot. If the higher priority device does not transmit, then the lower priority device has the chance to transmit at its transmission opportunity within the slot. Otherwise, the lower priority device has to wait for a future transmission opportunity, which will be in a later slot. However, this arrangement still allows lower priority devices to be accommodated.

Figure 5:
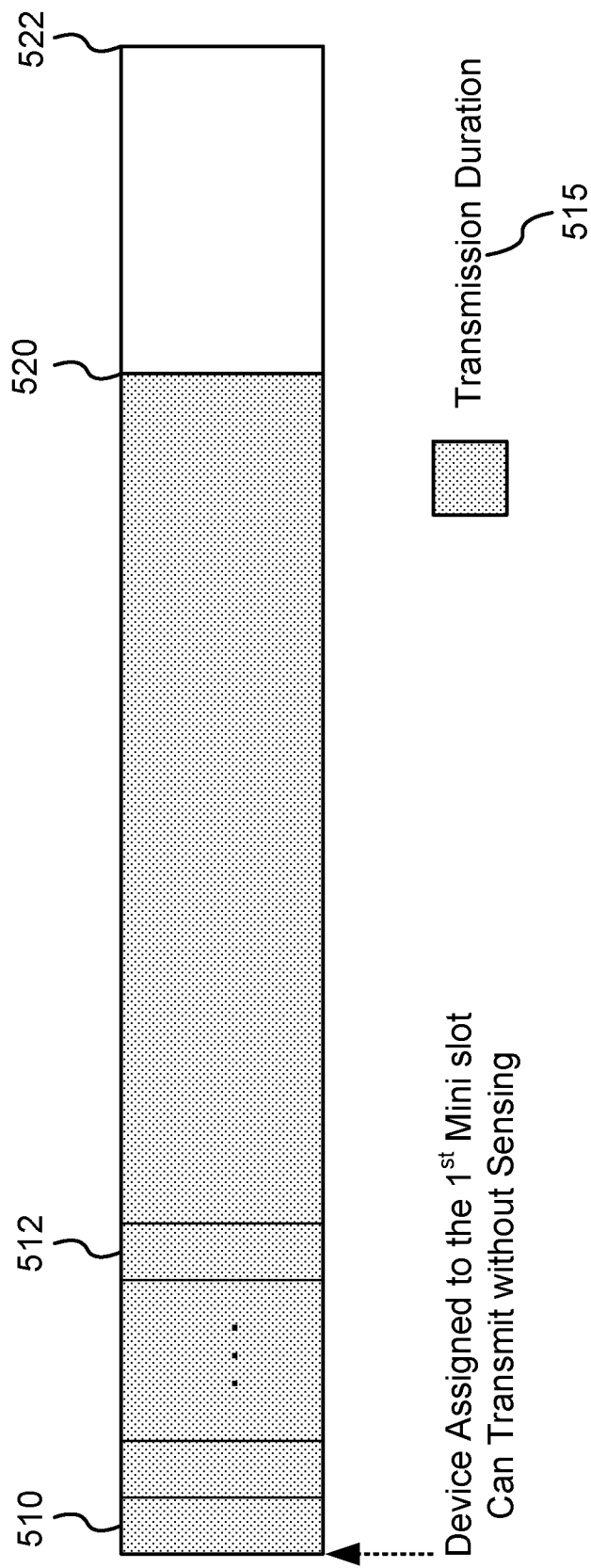
FIG. 5 illustrates transmission by a device using a transmission opportunity beginning in a first mini slot of a slot, in accordance with some embodiments of the present invention.

FIG. 5 further illustrates transmission by a device using a transmission opportunity beginning in a first mini slot, similarly to UE1 410 of FIG. 4. The transmission is illustrated via shading 515, as beginning in the first mini slot 510 of the slot. For illustrative purposes, the transmission ends at time 520 prior to the end 522 of the slot. The transmission extends past the last mini slot 512 of the slot.

A device assigned a transmission opportunity beginning in the first mini slot of a slot may operate as follows. When there is no packet to send, the device can remain in a sleep mode. When there is a packet to send, the device wakes up prior to the assigned slot and starts sending the packet immediately when its assigned slot begins (which is also the instant when the first mini slot of its assigned slot begins). After sending the packet, the device may go to the sleep mode. As used herein, the term "sleep mode" refers to a state of a device which is powered on, but which is not transmitting, receiving, or sensing (monitoring) the shared channel. The term "non-sleep mode" refers to a state of the device other than the sleep mode, that is, a device which is transmitting, receiving, or sensing (monitoring) the shared channel.

Figure 6:
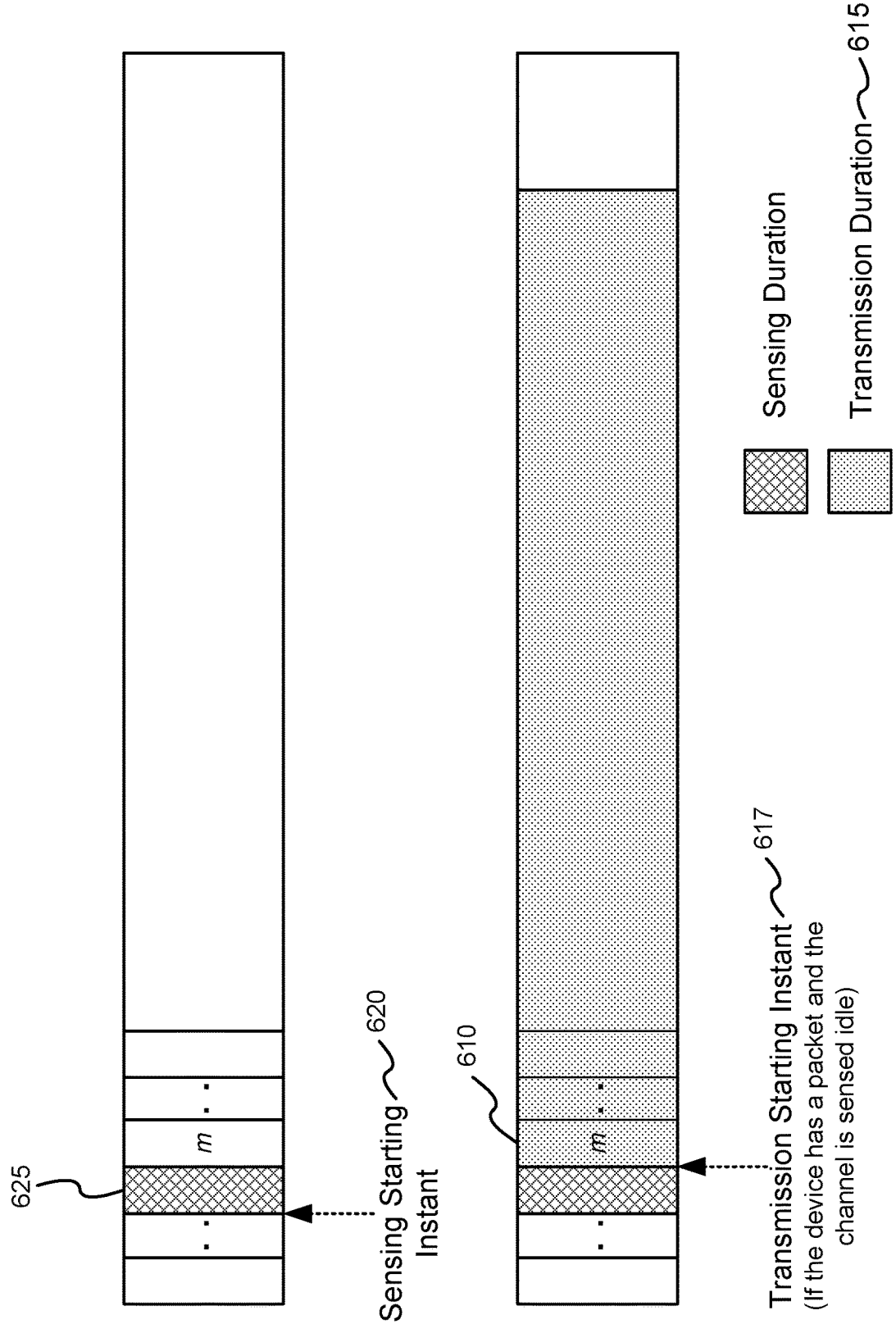
FIG. 6 illustrates transmission by a device using a transmission opportunity beginning in a mini slot following the first mini slot of a slot, in accordance with some embodiments of the present invention.

FIG. 6 further illustrates transmission by a device using a transmission opportunity beginning in a mini slot following the first, similarly to one of UE2 420, UE3 430 and UE4 440 of FIG. 4. The transmission 615 is illustrated beginning 617 in the $m^{th}$ mini slot 610 of the slot. Prior to transmission, the device monitors (senses) 620 the shared channel during the $(m-1)^{th}$ mini slot 625. Transmission occurs only when the channel is sensed idle during the $(m-1)^{th}$ mini slot.

A device assigned a transmission opportunity beginning in a mini slot following the first mini slot of a slot can operate as follows. When there is no packet to send, the device can remain in the sleep mode. When there is a packet to send, the device wakes up prior to the assigned slot. The device monitors the shared channel during the mini slot immediately preceding its assigned mini slot. For example, if the slot is assigned the 3rd mini slot of slot number 20, then the device monitors the channel in the 2nd mini slot of slot number 20. If the preceding mini slot is sensed idle, the device starts sending the packet immediately when its assigned mini slot begins. If the preceding mini slot is sensed busy, the device will not transmit in this slot and may go to sleep mode until the assigned slot comes, which may be for example, in the next cycle. A mini slot or slot is idle when it is not being used for transmitting a message by a device or by the access point. A mini slot or slot is busy when it is being used for transmitting a message by a device or by the access point.

Figure 7:
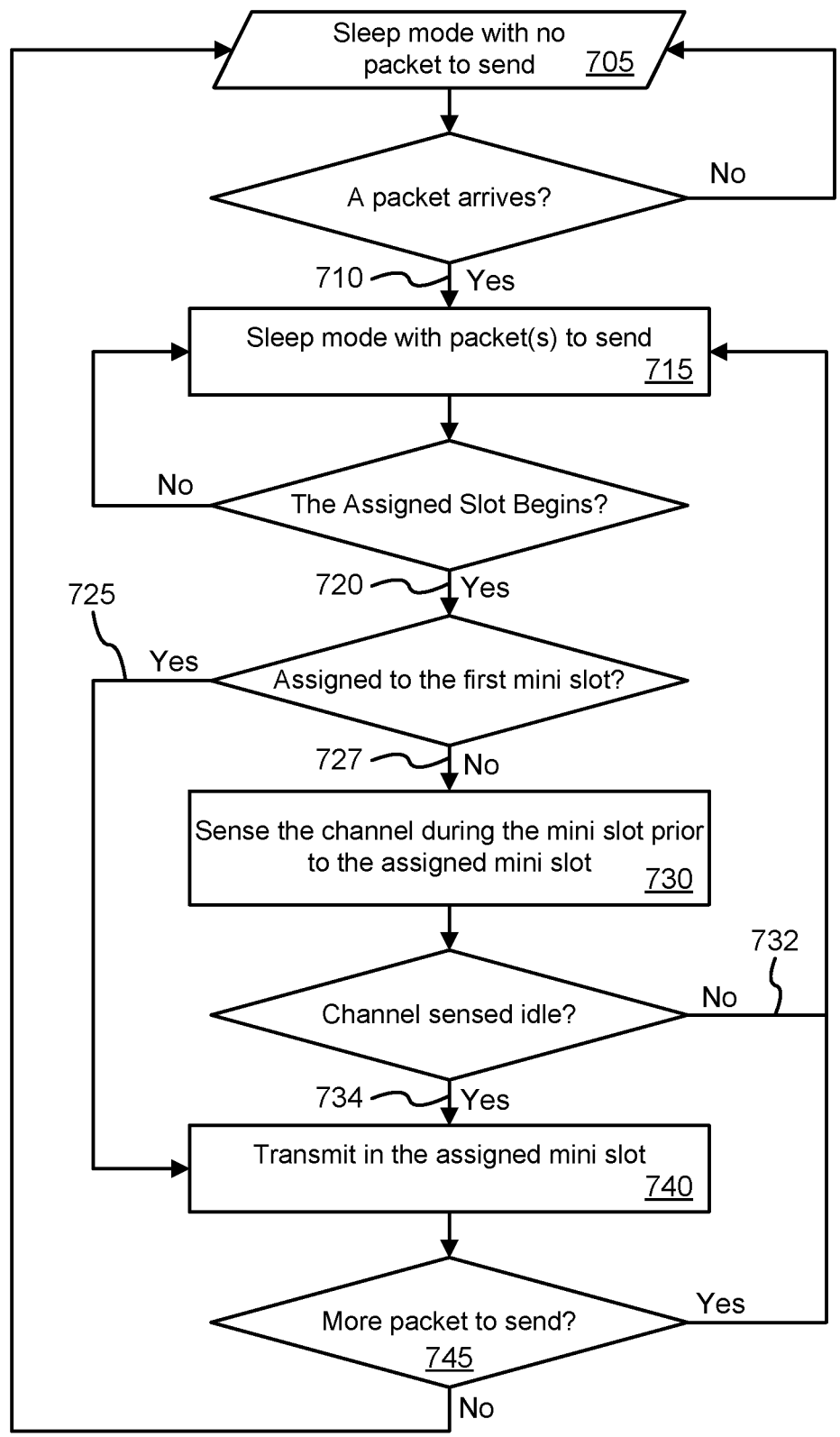
FIG. 7 illustrates a flow chart showing operation of a device potentially utilizing transmission opportunities, according to an example embodiment of the present invention.

FIG. 7 illustrates a flow chart showing operation of a device potentially utilizing transmission opportunities, according to an example embodiment of the present invention. According to FIG. 7, a device may initially be in sleep mode 705 with no packet to send. When a packet arrives 710, the device may transition into a sleep mode (or alternatively into a non-sleep mode) with a packet to send 715. From here, the device may wait for an assigned slot to begin 720. The assigned slot is a slot assigned to the device according to a predetermined schedule, which is communicated to the device for example via an access point scheduling message from an access point. Next, when the device is assigned 725, according to the schedule, to the first mini slot of the assigned slot, the device transmits 740 the packet during the transmission opportunity, which begins in the first mini slot of the assigned slot. Otherwise, when the device is assigned 727, according to the schedule, to another mini slot of the assigned slot, the device monitors 730 (senses) the shared channel during the mini slot immediately prior to the assigned mini slot of the assigned slot. The assigned mini slot of the assigned slot is a mini slot assigned to the device, according to the predetermined schedule, within the assigned slot. If the channel is not idle 732 at the time of monitoring 730, the device returns to state 715. Otherwise, if the channel is idle 734 at the time of monitoring 730, the device transmits 740 the packet during the transmission opportunity, which begins in the assigned mini slot of the assigned slot. Following transmission, the device determines 745 whether or not there are more packets to send, and returns to either state 705 or state 715 accordingly.

The access point or scheduler can schedule relatively higher priority transmissions (compared to other transmissions being scheduled) to begin in (e.g. one or more) mini slots occurring earlier in a corresponding time slot and to schedule relatively lower priority transmissions (compared to other transmissions being scheduled) to begin more mini slots occurring later in the corresponding time slot. The lower priority transmissions may be pre-empted by the higher-priority transmissions, and may proceed only if the higher-priority transmissions do not occur or if they end before the lower priority transmissions are scheduled to begin. Higher priority transmission can be transmissions from devices for example with higher quality of service requirements, lower delay tolerance requirements, lower tolerance for transmission repetitions, etc. For example, machines which are controlled in real time may be accorded higher priority status. Prioritization can be established in advance (e.g. as part of user subscription data) or dynamically (e.g. via a registration procedure involving communication with a device).

FIG. 4 also illustrates that the last mini slot 440 in the slot is used for synchronization sensing. In some embodiments, according to this operation, each device monitors (or senses) the shared channel during the last mini slot of at least some slots, and typically all slots. If the shared channel is not being used (i.e. is being idle) for uplink transmission at this time, the devices will begin the next time slot at a particular time prior to the scheduled end of the current time slot. The access point similarly monitors the shared channel and begins the next time slot at the particular time prior to the scheduled end of the current time slot. In this manner, the current time slot, being idle, is shortened, so that the next time slot can begin, thus reducing idle time on the shared channel. This is referred to herein as slot re-synchronization. Although the last mini slot is monitored in the current example, another time, for example a time following the last mini slot, can be monitored instead. In various embodiments, devices are required to begin transmitting immediately upon their transmission opportunity beginning, if they are going to perform a transmission at that transmission opportunity. This facilitates the operability of both collision avoidance and synchronization sensing schemes as described herein.

In some embodiments, if the devices perform slot re-synchronization in a distributed fashion, the beginning time of the next slot may be the end of the last mini slot of the current slot. In some embodiments, if the access point coordinates the synchronization sensing and slot re-synchronization process using a beacon (a signal), the beacon may begin immediately after the last mini slot of the current slot, and the beginning time of the next slot may be the end of the beacon. The length of the beacon may be a system parameter and pre-determined, and may be communicated to the devices from the access point as part of system information. In some embodiments, e.g. when the beacon is transmitted during a time interval following the slot and designated for downlink transmission as described elsewhere in this disclosure (e.g. time interval 1320 of FIG. 13), the length of the beacon can be equal to the length of the time interval.

It is noted that, when the timing of slots is adjusted according to synchronization sensing and slot re-synchronization, the timing of cycles, which include multiple slots, may be adjusted accordingly. For example, the scheduled beginning time of the next cycle can be advanced by the same amount of time as the scheduled beginning time of the next slot. This may be performed inherently if cycles are tracked by counting slots.

Accordingly, in some embodiments, the last mini slot of a slot is used for synchronization sensing, and, if the slot is detected idle during the last mini slot, the next slot begins immediately (after the last mini slot). In such embodiments, there are two possible slot lengths. A busy slot has length of $T_s=n_m \times T_m+T_x$, where $T_x$ is the length of the portion of the slot not allocated to mini slots, $n_m$ is the number of mini slots in each slot, and $T_m$ is the length of each mini slot. An idle slot has length of $T_s=n_m \times T_m$.

Figure 8:
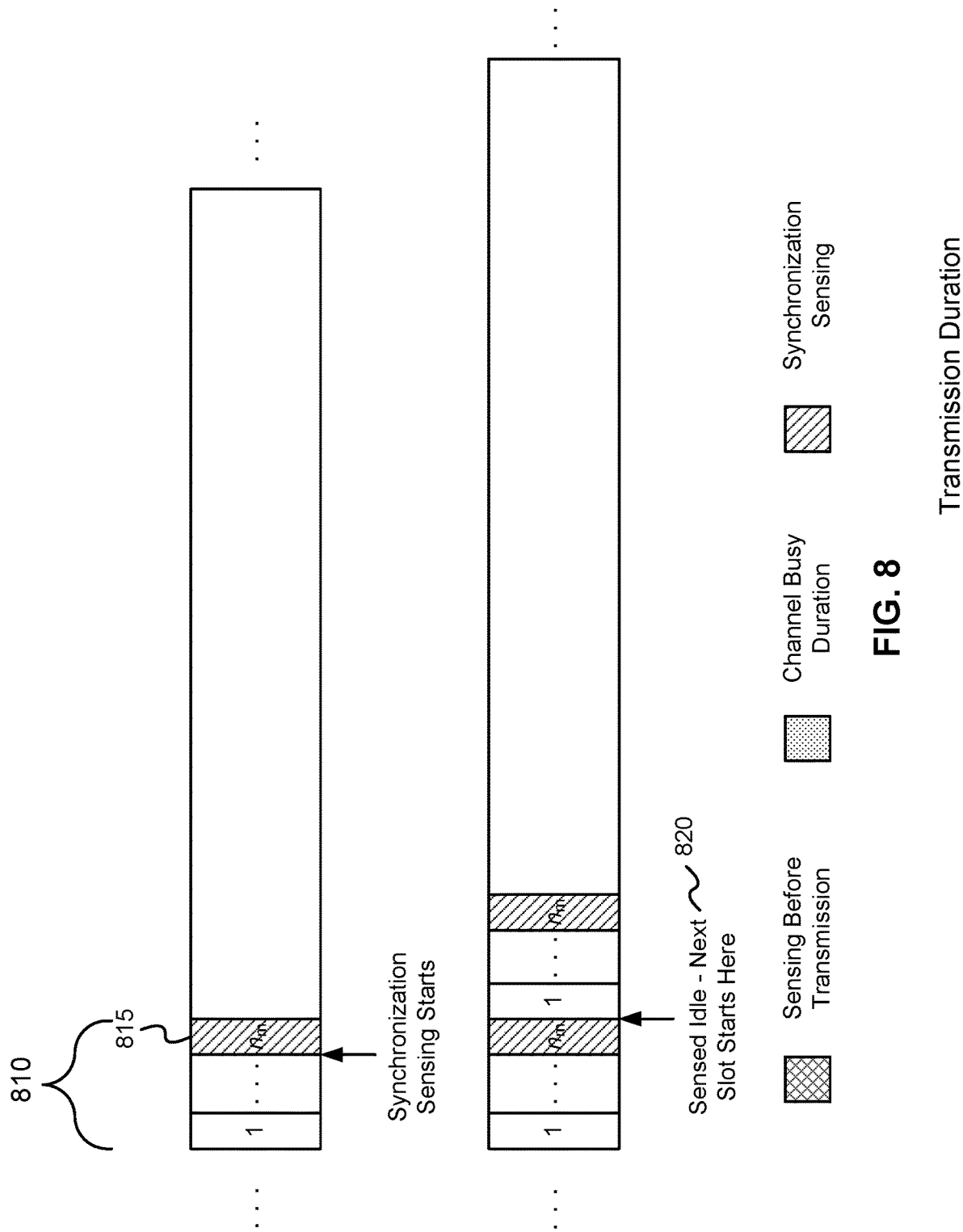
FIG. 8 illustrates synchronization sensing according to an embodiment of the present invention, in which a slot is sensed idle.

FIG. 8 illustrates synchronization sensing according to an embodiment of the present invention, in which a slot is sensed idle. All devices monitor the shared channel during or following the last mini slot 815 of the slot 810 for an indication that the slot is idle or busy. This may involve monitoring for transmission activity during the last mini slot, monitoring for a signal from the access point indicating that the slot is idle, or both.

In various embodiments, the network is fully connected, in the sense that all devices can detect the transmissions of all other devices in the network. If the network is not fully connected, the network can be divided into multiple fully connected zones. For example, the access point can coordinate an initial training, in which each device obtains a transmission opportunity while all other devices sense the channel. After all devices complete transmission, the access point collects the report from all devices to decide zones based on the sensing results of devices. For mini slot based sensing, only devices in the same zone can share the same slot. For synchronization sensing, the access point may broadcast a beacon as previously described.

In some embodiments, to accommodate a non-fully-connected network, when the last mini slot is detected idle by the AP, the AP can be configured to broadcast a signal or message, e.g. a short beacon with length no longer than a mini slot, immediately after the last mini slot. All devices in receipt of the signal or message are configured to determine the beginning of the next slot. For example, the devices can determine the beginning of the next mini slot to be one packet transmission time, or two mini slots, later from the beginning of the beacon. A technical advantage of this embodiment is that synchronization sensing can be supported even when the network is not fully connected.

When there is no transmission activity, the next slot begins immediately after the last mini slot, at time 820. It is noted that the next slot can begin at a later time, in other embodiments. Beginning the next slot may involve marking the end of the last mini slot as the beginning of the first mini slot of the next slot. Timing is then re-synchronized such that beginnings and ends of subsequent mini slots are defined relative to the newly defined beginning of the first mini slot of the new slot, as mentioned above.

Figure 9:
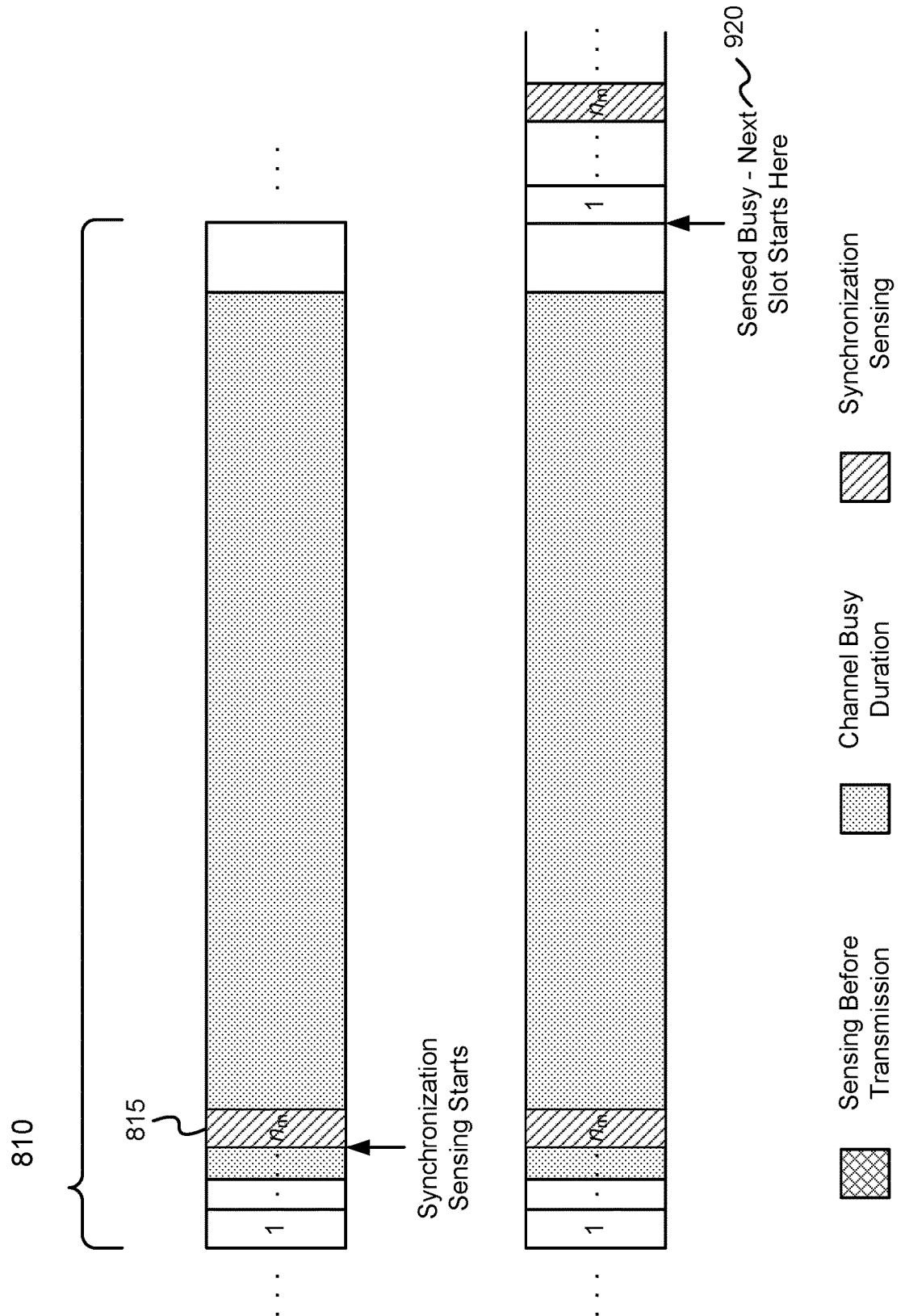
FIG. 9 illustrates synchronization sensing according to an embodiment of the present invention, in which a slot is sensed busy.

FIG. 9 illustrates synchronization sensing according to an embodiment of the present invention, in which a slot is sensed busy. All devices monitor the shared channel during the last mini slot 815 of the slot 810 for an indication that the slot is idle or busy. When there is transmission activity, the next slot begins at the end of the current slot, at time 920. That is, the next slot does not begin immediately but after a predetermined delay. In other words, when the slot is sensed busy, it has a longer time interval (or duration or length) than when the slot is sensed idle. The current slot is run for the length of $T_s=n_m \times T_m+T_x$.

Figure 10:
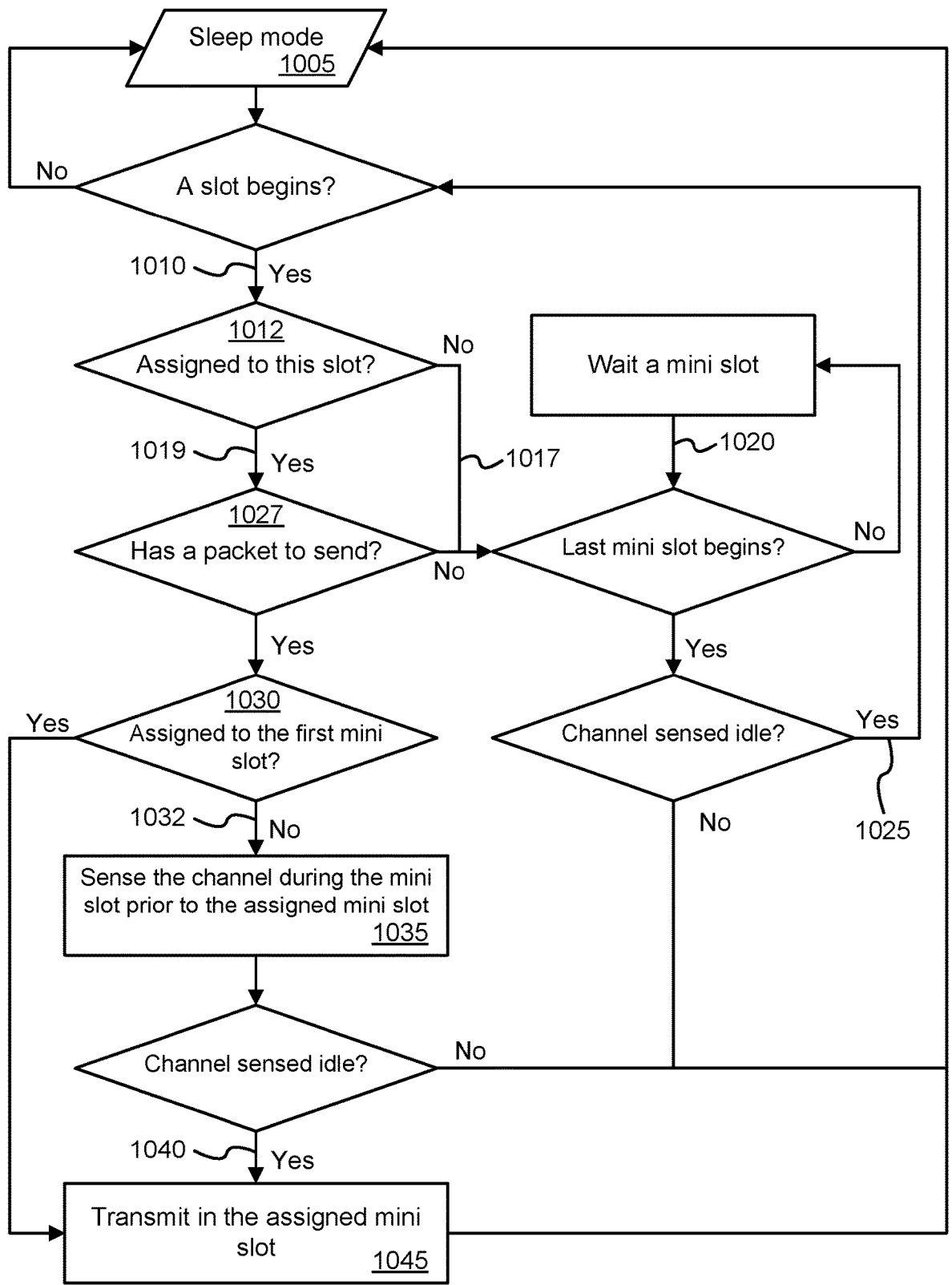
FIG. 10 illustrates a flow chart showing operation of a device potentially utilizing transmission opportunities and employing synchronization sensing, according to an example embodiment of the present invention.

FIG. 10 illustrates a flow chart showing operation of a device potentially utilizing transmission opportunities and employing synchronization sensing, according to an example embodiment of the present invention. According to FIG. 10, a device may initially be in sleep mode 1005. Each time a new slot begins 1010 the device determines 1012 whether it is assigned a transmission opportunity in the new slot. If not 1017, the device waits for the last mini slot to begin via sub-loop 1020. When the last mini slot begins, the device determines whether the channel is idle by monitoring the last mini slot. If the channel is determined to be idle 1025, a new slot is determined to begin 1010 immediately and the process repeats. Otherwise, the device enters sleep mode 1005 until the scheduled beginning of the next slot. Accordingly, a device wakes from sleep mode even in slots in which it has no transmission opportunity, in order to monitor the last mini slot for synchronization sensing purposes.

Otherwise, if the device is assigned 1019 a transmission opportunity in the slot, the device determines 1027 whether it has a packet to send (i.e. the device determines to use the transmission opportunity to transmit data). If there is no packet to send, the device again waits for the last mini slot to begin via sub-loop 1020 and implements the above procedure for beginning a new slot. If the device has a packet to send, it determines 1030 whether it is assigned to the first mini slot, i.e. its transmission opportunity is in the first mini slot. If so, the device transmits 1045 the packet beginning in the first mini slot and, if the transmission continues at least into the last mini slot, the device subsequently returns to the sleep mode 1005 until the scheduled beginning of the next slot. If the device determines 1032 that it is assigned to a mini slot other than the first mini slot, it senses (monitors) 1035 the shared channel during the mini slot prior to the assigned mini slot. If the channel is idle 1040 during this mini slot prior to the assigned mini slot, the device transmits 1045 the packet beginning in the assigned mini slot and, if the transmission continues at least into the last mini slot, the device subsequently returns to the sleep mode 1005 until the scheduled beginning of the next slot. Otherwise, the device returns to the sleep mode 1005 until the scheduled beginning of the next slot (except to wake and monitor the last mini slot), without transmitting its packet. If the device's transmission ends before the last mini slot, or if the device refrains from transmitting due to other activity on the shared channel, it still monitors the last mini slot for activity, and advances the beginning of the next slot if the last mini slot is idle. All devices should consistently monitor the last mini slot when synchronization sensing is being used, except for the case that the device itself is transmitting in the last mini slot.

Although synchronization sensing is described primarily in association with the mini slot based transmission opportunity scheme as described herein, it is also considered that synchronization sensing, i.e. advancing the beginning of a next time slot upon detecting that a current time slot is unused, can additionally or alternatively be provided for in other slot-based shared channel access schemes. That is, generally, devices, access points, or both, can monitor a shared, time-slotted communication channel at a time prior to an end of a current time slot. This is a time slot in which transmissions are potentially scheduled. The monitoring time is selected such that, if the channel is idle at the monitoring time, it will be idle for the remainder of the slot. For example, as described in embodiments disclosed herein, the monitoring time can be a last mini slot of a slot, where the slot includes one or more mini slots and extends for a time interval (or duration) beyond the last mini slot and transmissions are required to begin in a mini slot. When the shared, time-slotted communication channel is idle at this time prior to the end of the current time slot, an immediately next time slot can be commenced at a particular time prior to the otherwise scheduled end of the current time slot. That is, the beginning of the next time slot can be advanced. In some embodiments, the access point can also transmit an indication, such as a broadcast beacon (signal or message), to indicate to the devices using the access point that the next time slot is to commence at the particular time. The beacon can indicate the particular time, or the particular time can be known to all devices, for example by a rule which sets the time to be a predetermined time offset from the previously anticipated next time slot beginning. The particular time can be immediate or, or be after a predetermined delay, for example the length of one mini slot or a fraction thereof.

In some embodiments, assuming that all devices are within transmission range of each other, determining that the shared channel is not being used for uplink transmission in a slot can be supported by monitoring the shared channel for transmission activity at a particular time, for example during a last mini slot of the slot. Devices can thus monitor the shared channel during the last mini slot and determine that the entire slot is idle upon detecting that the shared channel is unused (idle) during the last mini slot. In some embodiments, determining that the shared channel is not being used for uplink transmission in a slot can be supported by having an access point monitoring the shared channel for transmission activity at the particular time, and transmitting a signal (e.g. beacon) or message or other broadcast indication of whether or not the shared channel is being used for uplink transmission in a slot. For example, the access point can broadcast a signal (e.g. beacon) following the last mini slot when the shared channel is not being used in the last mini slot.

In various embodiments, synchronization sensing is provided for in a distributed manner, in which a potentially large number of devices coordinate to improve channel usage efficiency without using message exchanges. This approach can reduce the time wasted in idle slots. Skipping the idle part of slots reduces the average length of a cycle, and may therefore decrease the latency experienced by all devices. Consequently, adding synchronization sensing to mini slot based carrier sensing can either support more devices without increasing latency or decrease latency when the number of devices is fixed.

In order to implement synchronization sensing, devices may be configured to monitor the shared channel during every slot instead of only during slots in which they are transmitting. Accordingly, devices may use their receiver and processor more frequently, which can consume additional power. In some cases, synchronization sensing may be omitted for example in order to save power.

In some embodiments, the schedule can include at least two transmission opportunities for at least two different devices, where each of these at least two transmission opportunities indicate a same respective time slot and a same respective mini slot. That is, two or more devices can be scheduled, by a centralized scheduler, to use the same transmission opportunity. This is also referred to herein as superposed mini slot assignment. This approach can be used for example when devices are expected to use their transmission opportunities only with some probability less than one. This can be the case for example when devices only occasionally have data to send and thus only occasionally use their scheduled transmission opportunities. This approach potentially improves efficiency by reducing the number of idle slots. That is, channel usage efficiency can be increased while managing packet collisions.

Figure 11:
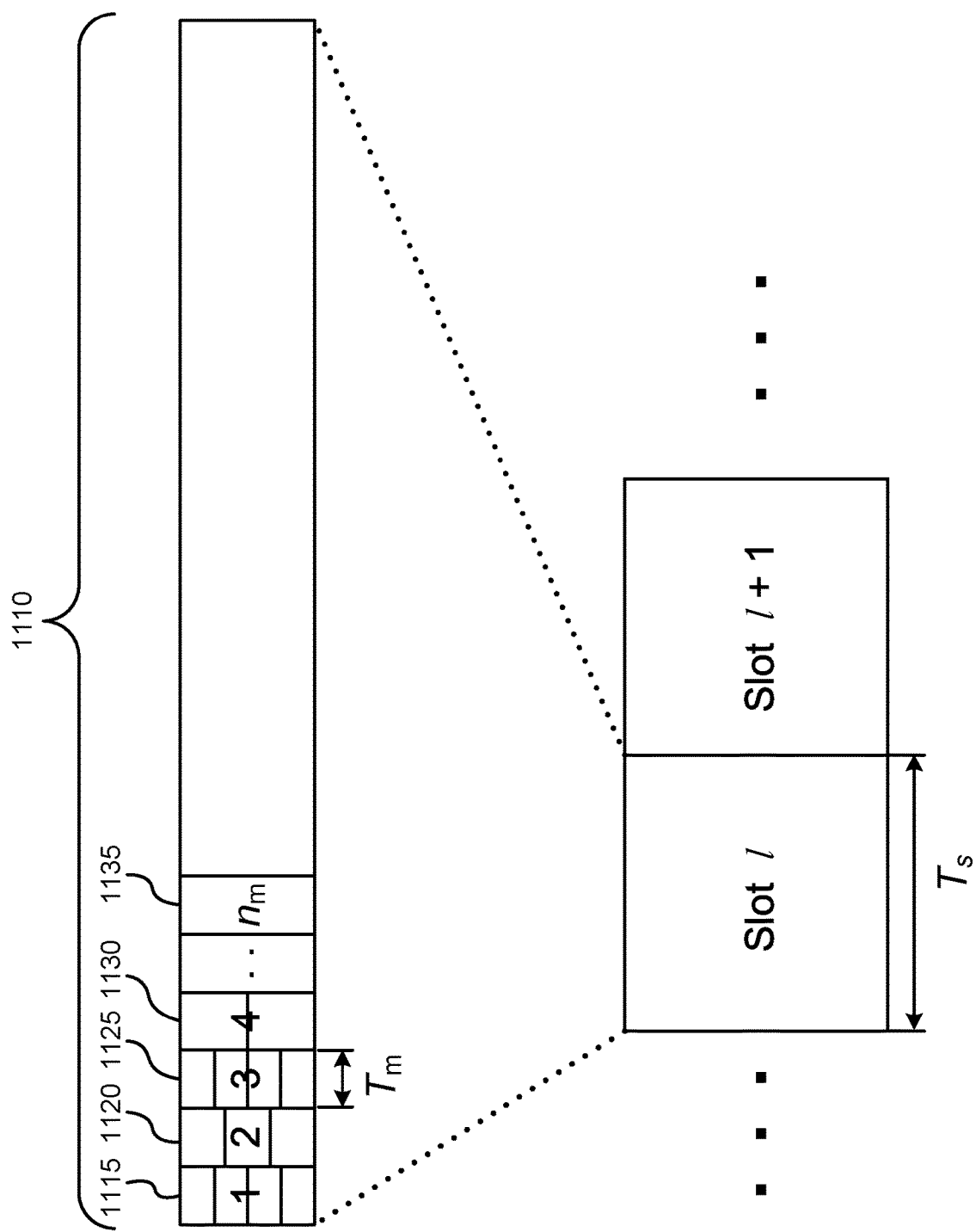
FIG. 11 illustrates an example slot and mini slot structure in which multiple transmission opportunities are scheduled for multiple devices in some of a plurality of mini slots, in accordance with some embodiments of the present invention.

FIG. 11 illustrates an example slot and mini slot structure in which multiple transmission opportunities are scheduled in each of a plurality of mini slots, in accordance with superposed mini slot assignment. The slot 1110 includes m mini slots. The first mini slot 1115 is scheduled as a transmission opportunity for four different devices. The second mini slot 1120 is scheduled as a transmission opportunity for three different devices. The third mini slot 1125 is scheduled as a transmission opportunity for four different devices. The fourth mini slot 1130 is scheduled as a transmission opportunity for two different devices. The $m^{th}$ mini slot 1135 is scheduled as a transmission opportunity for one device.

With the superposed mini slot assignment being applied, all devices may still perform mini slot based synchronization sensing and slot re-synchronization as described elsewhere herein. When performing channel sensing in the preceding mini slot or transmitting in its assigned mini slot, a device may act in the same way as if it were the only device assigned to its mini slot. In other word, no sensing or other coordination is performed among a group of devices assigned to the same mini slot. Rather, collision detection is performed after transmission, for example as described below.

When multiple devices use the same transmission opportunity a collision may occur. A collision can occur when two or more devices begin transmitting in the same mini slot of the same slot, due to these devices being assigned to the same slot and mini slot as a transmission opportunity and other conditions (e.g. no other devices are already transmitting in the preceding mini slots of the slot) are satisfied.

Therefore, according to various embodiments, a collision detection and resolution mechanism is also provided for. For example, in some embodiments, the access point can monitor for collisions due to multiple devices using the same transmission opportunity. Upon detecting such a collision, the access point can transmit a collision indication in the time slot. The collision indication can be a beacon or alarm signal which is transmitted until the end of the time slot, and the transmitting devices can be configured to ensure their transmission ends prior to the end of the time slot, and then monitor for the beacon after the transmission ends. This is useful when the beacon is transmitted on the shared channel, or when the devices are half duplex (can only transmit or receive at a given time). The devices can be configured to monitor for the beacon for example at the time immediately prior to the end of the time slot.

Upon detecting the collision indication, the devices can determine that the transmission is unsuccessful. In such cases, the devices may be configured to retransmit at a future scheduled transmission opportunity. Other collision resolution measures can also be taken, for example by implementing a random backoff or other scheme. Random backoff parameters can be set based at least in part on the current delay of the packet, channel access fairness, or the like, or a combination thereof. In some embodiments, the devices monitor for the collision indication (e.g. on the shared channel) after their transmission is completed. In other embodiments, the devices monitor for the collision indication (e.g. on another channel) during their transmission.

In some embodiments, no retransmission is required by devices. In such cases, collision detection and resolution can be omitted.

Superposed mini slot assignment described above can potentially increase the number of supported devices by assigning multiple devices into each mini slot at the cost of nonzero collision probability. The collision probability can be managed or controlled by scheduling techniques. Scheduling can be configured to allow for a small packet collision probability in order to support a large number of devices. In order to limit packet collision probabilities, the AP may be configured to evaluate the impact on delay and collision while adding devices into, or assigning devices to mini slots.

In various embodiments, the access point operates to transmit scheduling messages to devices, which includes a schedule that designates or indicates transmission opportunities and devices associated with (or to) these transmission opportunities. In some embodiments, the schedule can be broadcast, for example periodically, and each device can receive the broadcast and determine its transmission opportunities based thereon. In some embodiments, the schedule can be unicast to different devices. Each unicast message may indicate the transmission opportunities for the device to which the unicast message is sent.

Figure 13:
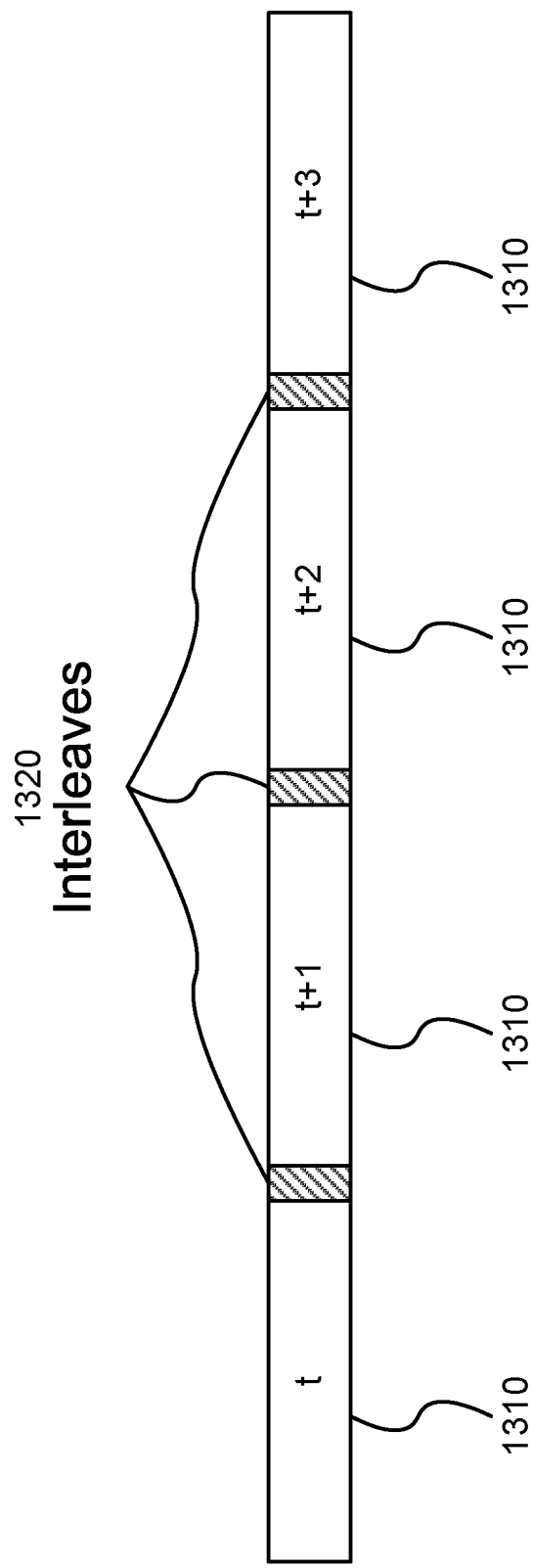
FIG. 13 illustrates interleaving of the shared channel with slots used for uplink transmission, and time intervals used for downlink transmission, in accordance with some embodiments of the present invention.

The access point may further be configured to transmit system information messages, for example via broadcast. The system information messages are separate from scheduling messages or other operating messages such as collision indications, and indicate the particular configuration of the access point. For example, the system information message can indicate how often scheduling messages are sent and the particulars of transmission of scheduling messages (e.g. whether they are broadcast or unicast.) As another example, the system information messages can indicate cycle length (e.g. in terms of number of slots), slot length (e.g. in certain time unit), mini slot length (e.g. in certain time unit), the number of mini slots per slot, the beginning point (in time) of next slot, or a combination thereof. As another example, the system information message can indicate whether or not idle time slots are truncated according to slot resynchronization (i.e. whether or not synchronization sensing should be enabled or activated). The system information message can indicate whether or not the access point is configured to transmit a signal indicative that a time slot is idle and that slot re-synchronization is to occur in accordance with synchronization sensing. As another example, the system information message can indicate whether superposed mini slot assignment is enabled, such that the same time slot and mini slot is potentially designated as a transmission opportunity for multiple devices, thus prompting the devices to monitor for potential collisions. The system information message can further indicate whether the access point will transmit a collision indication (e.g. a beacon signal or NACK transmitted in the same slot as the collision) upon detecting such a collision. The system information message can indicate what types of feedback (if any) are provided by the access point. The system information can indicate whether the shared channel is interleaved with slots used for uplink transmission, and equal-length time intervals used for downlink transmission (as illustrated in FIG. 13), and length of such a time interval. Other particular operating parameters can be communicated via system information messages.

Devices can configure their operation according to content of system information messages. For example, when the system information messages indicate that synchronization sensing is active, devices can adjust their operation to monitor the last mini slot of each slot and re-synchronize to advance the beginning of the next slot when the last mini slot is idle. Devices can be configured to monitor the shared channel for a beacon when the system information message indicates that the access point broadcasts such beacons. Devices can be configured to monitor the shared channel for collision indications (which can be in the form of NACK) or other feedback (e.g. ACK indicating successful transmission, as described later in this disclosure) when the system information message indicates that the access point broadcasts such collision indications or other feedback. Devices can be configured to monitor for downlink messages or signals at certain time intervals which the system information message designates as being used for downlink transmissions (e.g. transmissions of collision indications, NACKs or other feedback from the access point) are interleaved with the slots.

According to various embodiments, differentiated assignment cycles are provided for. In some embodiments, in order to satisfy latency requirement for example as specified for industrial IoT devices, especially for high priority (HP) devices, differentiated cycles can be used for different type of devices. Accordingly, HP devices can have transmission opportunities more frequently. A technical advantage of such embodiments is that prioritization of devices can be further supported by allocating more transmission opportunities to higher priority devices and fewer transmission opportunities to lower priority devices, in a structured manner, thus simplifying operation.

Figure 12:
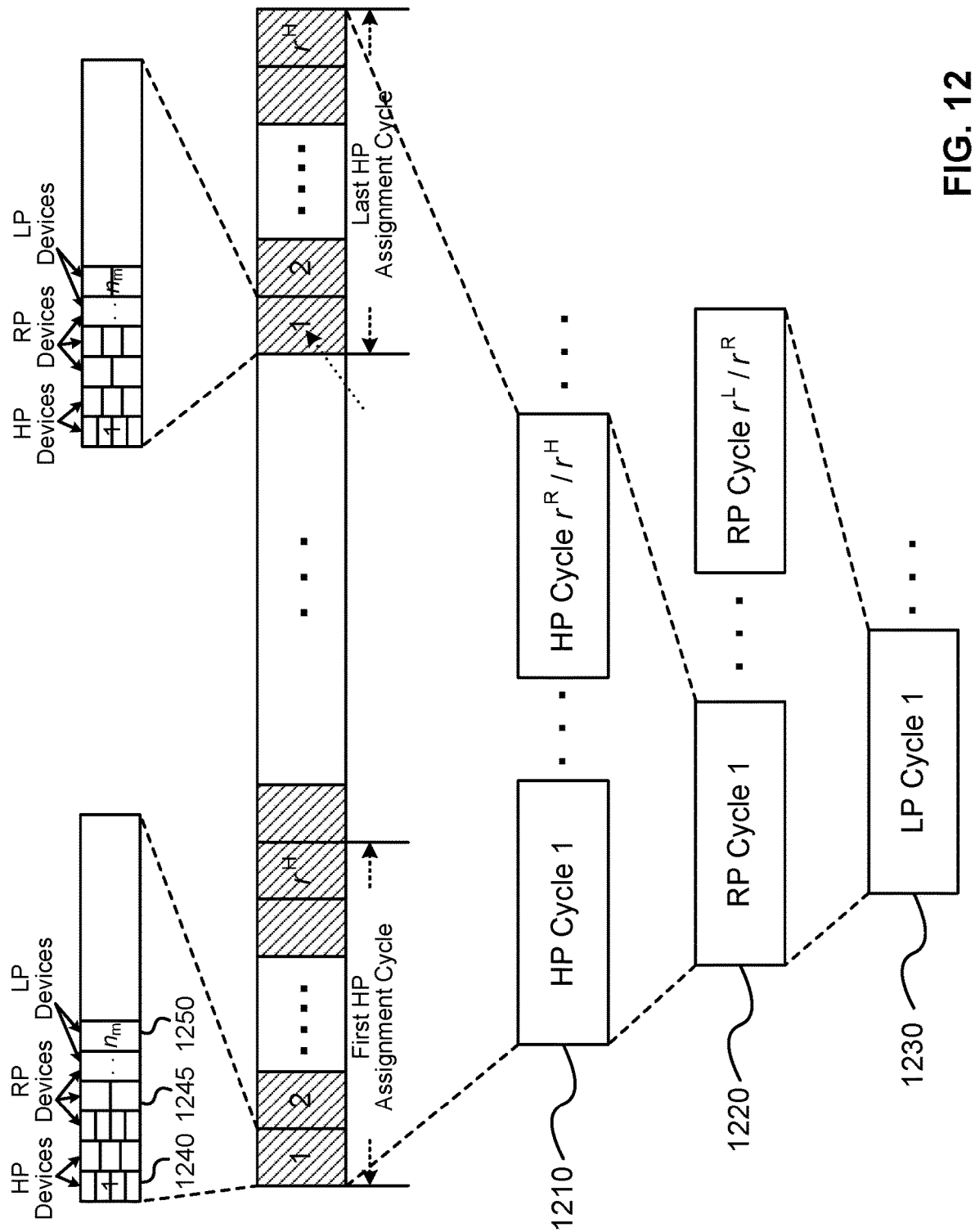
FIG. 12 illustrates differentiated transmission opportunity assignment for prioritized devices, in accordance with some embodiments of the present invention.

The description of differentiated assignment cycles according to some embodiments of the present invention is given as follows. HP devices have short assignment cycles. Each HP assignment cycle 1210 consists of $r^H$ slots, as shown in FIG. 12. Therefore, each HP device has a slot assigned to it every $r^H$ slots. Accordingly, each HP device has a potential transmission opportunity every $r^H$ slots, noting that the device can utilize the transmission opportunity if no device assigned to preceding mini slots of the same slot transmits. Regular priority (RP) devices have longer assignment cycles. Each RP assignment cycle 1220 consists of $r^R/r^H$ (or the closest integer thereto) HP assignment cycles 1210 and thus $r^R$ slots. Therefore, each RP device has a slot assigned to it every $r^R$ slots. Low priority (LP) devices have the longest assignment cycles. Each LP assignment cycle 1230 consists of $r^L/r^R$ ((or the closest integer thereto) RP assignment cycles 1220 and thus $r^L$ slots. Therefore, each RP device has a slot assigned to it every $r^L$ slots.

Combining mini slot based sensing and differentiated assignment cycles, embodiments of the present invention can be configured to apply the following rule, as also illustrated in FIG. 12: HP devices should be assigned to (i.e. provided transmission opportunities beginning in) the first several mini slots 1240 of all slots (unless a slot is not assigned to any HP device). The assignment of HP devices repeats every $r^H$ slots. RP devices should be assigned to the next several mini slots 1245 of all slots (unless a slot is not assigned to any RP device). The assignment of RP devices repeats every $r^R$ slots. LP devices should occupy the last several mini slots 1250 of all slots (unless a slot is not assigned to any LP device). The assignment of RP devices repeats every $r^L$ slots.

Accordingly, in various embodiments, the three features of differentiated assignment cycles, mini slot based sensing and superposed mini slot assignment can be combined together facilitate the choices of both the set of devices to assign mini slots and the frequency of assignment.

FIG. 13 illustrates interleaving of the shared channel with slots 1310 used for uplink transmission, and time intervals 1320 used for downlink transmission. The time intervals 1320 have equal length and can be used for transmitting acknowledgements by the access point or other receiving device, for example. This can be used to facilitate communication reliability when channel conditions are unreliable, for example. In various embodiments, when a transmission is not acknowledged, it may be retransmitted. The time intervals 1320 are also referred to as "interleaves." If synchronization sensing is being used, the timing of the time intervals is adjusted upon advancing the beginning of a next slot during a re-synchronization operation. This can be done by advancing the beginnings of the time intervals 1320 by the same amount of time by which the beginning of a next slot is being advanced.

In some embodiments, the time intervals 1320 can be treated as being separate from the neighbouring slots. In other embodiments, the time intervals 1320 can be treated as being part of a neighbouring (e.g. the preceding) slot. In the latter case, the time interval may be a portion of the slot which is reserved for downlink transmissions. In this case, synchronization sensing and slot re-synchronization may operate as described above, with the understanding that the time intervals 1320 may still be allowed to occur in the slot before the slot ending is advanced. That is, if the current slot is being shortened due to re-synchronization, the time interval may be advanced as well but completed before the new, advanced ending of the current slot.

In some embodiments, one of the time intervals 1320 is skipped during slot re-sychronization, with the understanding that no DL transmission will happen during the time interval. That is, if the current slot is being shortened due to re-synchronization, the time interval is skipped when the beginning of a next slot is being advanced such that the current slot and the next slot are not separated by the time interval. In this case, the next slot starts immediately when or after the current slot ends.

The interleaving may facilitate a single receiver such as an access point sending an acknowledgement (ACK). If the transmission is targeting multiple receivers and if an ACK is expected from every receiver, then the receivers be configured to avoid using the interleave to send the ACK. Instead, a higher layer approach may be applied. For example, a device may send its ACK at its own transmission opportunity, or the devices may notify the AP and the AP sends an ACK to the sender on their behalf. If the channel is reliable, then the interleaves are not necessary. When multiple channels are available, depending on their reliability requirement, devices can be assigned by the access point to a reliable channel.

As already described above, in some embodiments the access point may transmit a collision indication upon detecting a collision. The collision indication as described above is transmitted in the same slot as the collision itself, and may be regarded as a negative acknowledgement (NACK) message. In contrast, the time intervals 1320 of FIG. 13 can be used by the access point to transmit acknowledgements. It is considered that the time intervals 1320 can be used by the access point to transmit negative acknowledgements in other embodiments. More generally, the access point can be configured to transmit feedback (ACK or NACK) to the devices, the feedback indicative of transmission success or failure. The feedback can be transmitted by the access point in the same slot as the transmission which the feedback is indicative of. The feedback can be transmitted by the access point in a slot which follows the transmission which the feedback is indicative of.

Embodiments of the present invention can be employed in scenarios with a single, shared access channel, where prioritization capability is desired. Messaging and control overhead can be limited while coordinating a potentially large number of devices. Embodiments of the present invention can be employed in a high-density environment such as a factory environment, with potentially large numbers of devices such as wireless sensors and controllers. Ultra reliable low latency communications (uRLCC) and massive machine type communications (mMTC) can be supported.

In an example embodiment, 1000 devices share a common communication channel in a factory. High priority devices can be afforded a short communication latency (e.g. <1 ms) and a high reliability (e.g. <1% collision probability). In some embodiments, all devices reside in an area with diameter of about 100 meters. Transmissions can be relatively short, for example 50 bytes of physical layer packet length. In some embodiments, latency tolerance for high priority, medium priority and low priority devices are on the order of approximately 1 ms, 10 ms, and 10-100 ms, respectively. In some embodiments, collision probability tolerance for high priority, medium priority and low priority devices are on the order of approximately 1%, 5% and 12%, respectively.

In various embodiments, scheduling configuration is performed as follows, when a device first connects to an access point (AP), the devices reports its estimated packet arrival rate, if available, to the AP. The AP may provide system information to the device, which contains the slot length and mini slot length, the synchronization information (to synchronize the slots with the AP). The AP also provides a scheduling message, including at least one slot and mini slot assigned to this device. The scheduling message can be provided in a system information message or in a different message. Over time, if the device assignment is updated by the AP, the AP can announce the updated assignment to the devices via a scheduling message (which is broadcast to all the devices or uni-casted to individual devices).

In some embodiments, a mini slot has the length of $T_m$, which is substantially less than $T_s$. For example, $T_m$ may be set to 9 microseconds, which is enough to cover both the time needed for channel sensing and the propagation delay of wireless signal in certain anticipated scenarios. Assuming there are $n_m$ mini slots in each slot, then the slot time $T_s = n_m \times T_m + T_x$. Here, $n_m \times T_m$ may be required to be less than $T_x$, where $T_x$ is the length of the portion of the slot not allocated to mini slots. That is, referring back to FIG. 3, the first part of the slot 320, which includes a plurality of mini slots, is shorter than the second part of the slot 330 which is not subdivided into mini slots. If this condition is not met, more than one packet transmission may potentially happen in the slot since the device assigned to the last mini slot may not be able to sense a busy channel.

While the assignment of slots and mini slots are made by the AP via centralized scheduling, the channel access operation involving mini slot based carrier sensing is distributed. By combining distributed coordination with centralized scheduling, embodiments of the present invention can assign a slot to more than one device and avoid packet collisions. Moreover, explicit message exchange requirements are reduced because information is obtained via mini slot sensing. Therefore, mini slot based carrier sensing may increase slot (and thus channel) usage efficiency.

Generally, devices assigned to mini slots with larger indexes have larger delay. For clarity the first mini slot is assigned smallest index (e.g. 1), the second mini slot is assigned a larger index (e.g. 2), the third mini slot is assigned a yet larger index (e.g. 3), and so on. To address this, the number of mini slots in a slot may be limited. Meanwhile, higher priority devices may be assigned to mini slots with lower/smaller indexes and lower priority devices may be assigned to mini slots with higher/larger indexes.

In some embodiments, scheduling of transmission opportunities is done based at least in part on an estimate of device latency, and is configured at least in part to limit such latency, as well as to limit collision probability. Latency may include the time delay experienced while waiting for a transmission opportunity and the time duration of a packet transmission. Based on analysis of delay for each mini slot, the scheduler may assign devices to mini slots, beginning with the first mini slot of each slot, and then proceeding each further mini slot in turn. While assigning a mini slot to a device, the scheduler may be configured to estimate the latency for the device based on the mini slot index, the aggregated packet arrival rate of the target mini slot, and the aggregated packet arrival rate of devices in all preceding mini slots.

While assigning a mini slot to a device, the scheduler (which may be part of the AP) may be configured to estimate the collision probability based on the latency for devices in the target mini slot as well as the packet arrival rate of devices in the mini slot. Using the estimated latency and collision probability, the scheduler can determine an appropriate mini slot for a device so that the latency and collision probability corresponding to the type of the device are not violated. The protocol parameters, such as the number of mini slots in each slot, and the number of slots for each HP, RP, and LP cycle, respectively, may be determined with assistance of a neural network (DNN).

According to some embodiments, the centralized scheduling (by the scheduler which may part of the AP) includes three parts: determining the number of mini slots in a cycle (i.e., $n_m$); determining the number of slots in each HP, RP and LP assignment cycle (i.e., $r^H$, $r^R$, $r^L$, respectively); and assigning slots and mini slots to devices. Even though a low-complexity heuristic algorithm can be used to assign slots and mini slots, considering a significantly large number of potential combinations of $\{n_m, r^H, r^R, r^L\}$, a lower-complexity method for finding a proper combination may be beneficial. Therefore, according to embodiments of the present invention, a deep neural network (DNN) is provided and configured to assist scheduling.

Figure 14:
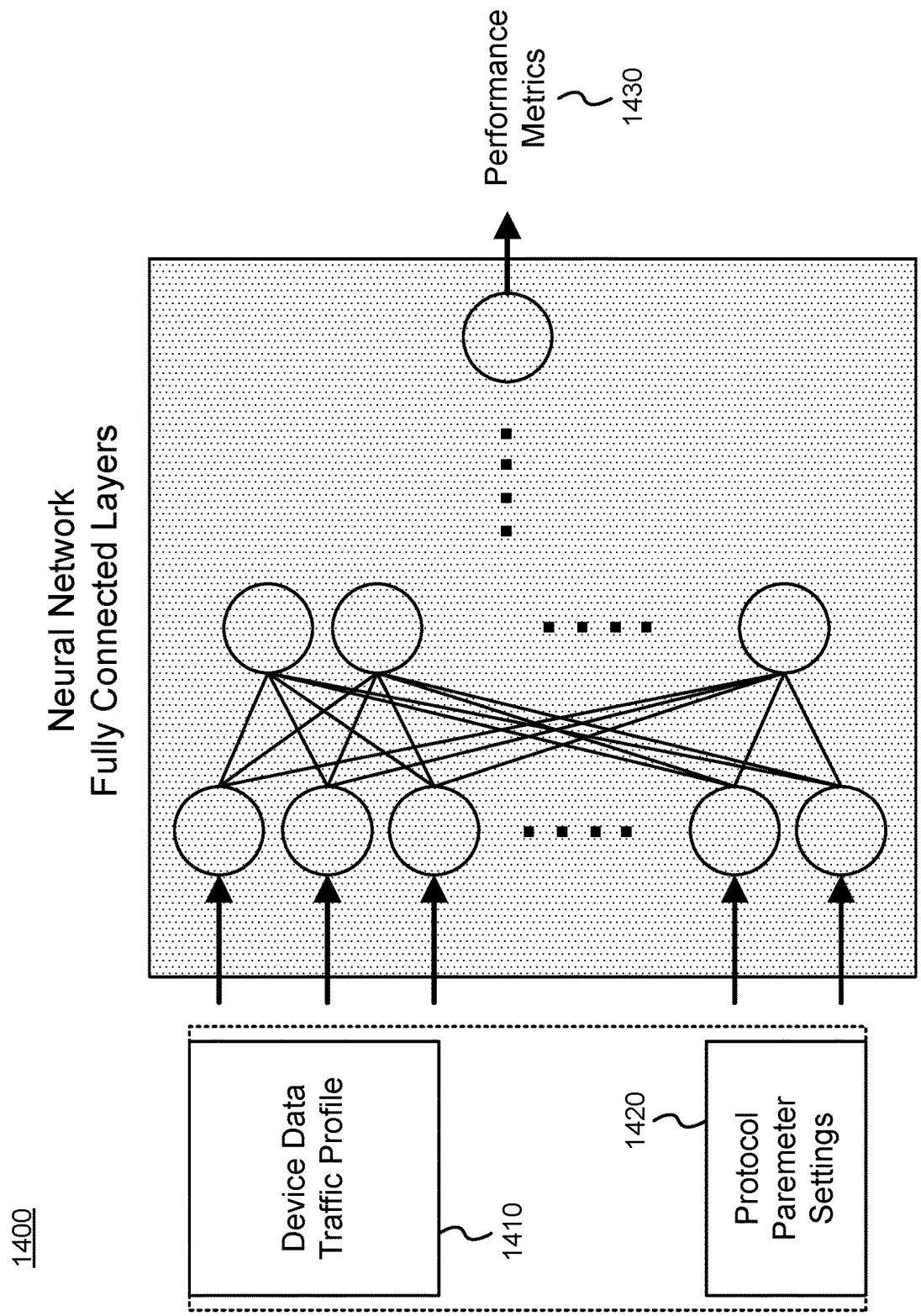
FIG. 14 illustrates a neural network configured to facilitate scheduling, in accordance with some embodiments of the present invention.

In some embodiments, and with reference to FIG. 14, the neural network 1400 includes a first input group 1410, a second input group 1420, and an output 1430. The first input group is indicative of a device data traffic profile. In order to handle a wide range of number of devices, the AP divides the entire range of packet arrival rates into sections and obtains the number of devices in each section. For example, if the maximum and minimum packet arrival rates among all devices are 0.1 packets/second and 100 packets/second, respectively, then 1000 sections of packet arrival rates, i.e., [0, 0.1), [0.1, 0.2), . . . [99.9, 100) can be used. The AP counts the number of devices in each section based on their packet arrival rates. The second input group is indicative of protocol parameter settings. This includes the value of protocol parameters $\{n_m, r^H, r^R, r^L\}$. For example, if each slot consists of 8 mini slots, each HP, RP, and LP assignment cycle consists of 5, 35, 175 slots, respectively, then the input group 2 is $\{8, 5, 35, 175\}$. The output group is indicative of performance metrics. This may include the value of latency and packet collision for all devices under the device data traffic profile and protocol parameter settings specified by the input of the DNN.

Using the neural network can include training data generation, offline DNN training, and selecting of protocol parameters. According to training data generation, given the device data traffic profile and protocol parameter settings, a heuristic algorithm or other approach may be used to obtain device assignment. The performance of the device assignment is then estimated in simulation.

For offline training of the DNN, using extensive data with various device data traffic profile and protocol parameter settings, as well as the resulting performance as labels, the DNN is trained to learn the mapping from the input (device data traffic profile and protocol parameter settings) to the output (latency and packet collision performance).

For selecting protocol parameters, once the DNN is trained, when the AP is deployed in a network and has obtained the packet arrival rate information for the devices, the protocol parameter settings can be selected by using the trained DNN and comparing the resulting performance at the output.

The use of the DNN may, in some embodiments, significantly reduce the complexity and time required for selecting protocol parameters, due for example to the following reasons. First, extensive training can be done offline, before knowing a specific device data traffic profile. Second, given a specific device data traffic profile, the evaluation for any protocol parameter setting can be done via the DNN with negligible time consumption, compared to running a simulation. Therefore, despite the large number of potential protocol parameter combinations, a proper choice can be made in a shorter amount of time.

Embodiments of the present invention can be implemented in a manner which trades off among the supported number of devices, channel efficiency, overhead, and energy efficiency, and provides flexibility to achieve various balances in different scenarios. This is not only reflected by the options of using various protocol parameter settings (e.g., number of mini slots in a slot, HP/RP/LP cycle lengths) but also reflected in the combinations of proposed design elements. For example, in the case of a limited number of devices but very high packet arrival rates, fewer mini slots can be used in mini slot based sensing while superposed mini slot assignment may be skipped. In the case where energy efficiency is a significant concern while delay requirement is secondary, synchronization sensing can be skipped so that each device can only wake up if it has a packet to send. In the case when channel efficiency should be further improved, the synchronization sensing may be changed (e.g., all devices will sense during the entire packet transmission duration so that the next slot can start as soon as the current transmission finishes).

Some embodiments of the present invention are readily applied to (e.g. wireless) networking in a limited area with a centralized AP. In the case of larger areas with multiple APs, embodiments of the present invention can be extended. For example, a hierarchy of APs can be used where coordination among APs can reduce or avoid conflict of packet transmissions in adjacent areas. Specifically, the use of zones in the coverage of each AP can be used in such a case. Then, the APs can schedule transmissions in different zones so that the hidden/exposed terminal problem can be avoided.

Simulation results indicative of performance of some embodiments of the present invention are now presented.

The simulation involves mini slot based sensing, synchronization sensing, and superposed mini slot assignment, in combination. The number of devices is 1000, including 50 HP, 450 RP, and 500 LP devices.

The number of mini slots per slot $n_m$ is set to 8. Each mini slot is 9 μs in length, and each transmission time is 133 μs in length (i.e., 50-byte physical layer packet transmission at 3 Mb/s). Therefore, a slot in its full length is 8*9+133=205 μs while an idle slot is 8*9=72 μs in length with synchronization sensing. Poisson arrival is used with mean packet arrival rate uniformly generated in the range of [1, 5] packets/device/second. A buffer is assumed at each device. A simulation duration of 400 seconds is used. The HP and RP assignment cycles, i.e., $r^H$ and $r^R$, are 5 slots and 45 slots, respectively, in both FIG. 15 and FIG. 16. The difference is in the LP assignment cycle $r^L$, which is set to 270 in FIG. 15 and 180 in FIG. 16.

Figure 15:
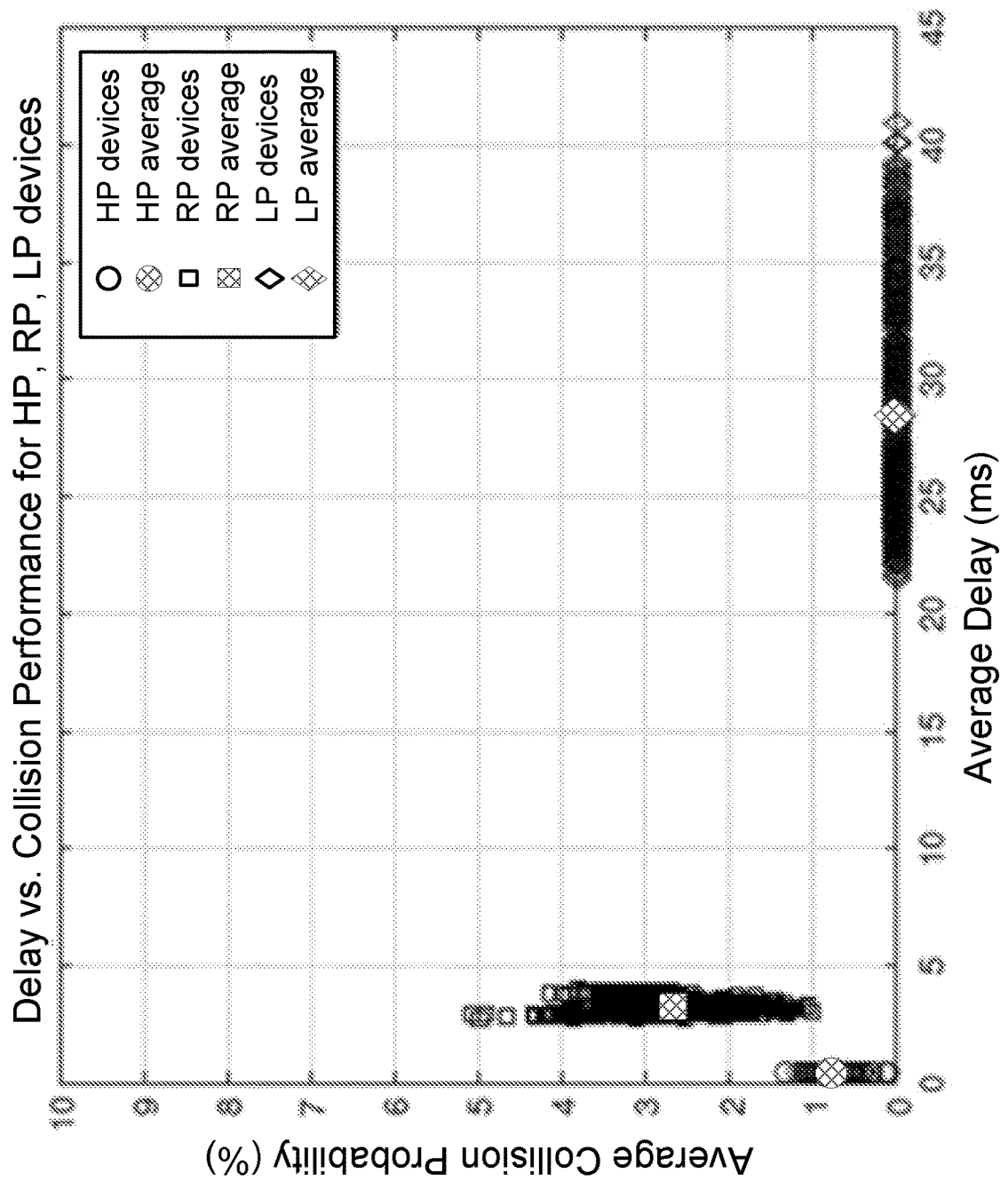
FIGS. 15-18 illustrate simulation results illustrating performance of example embodiments of the present invention.
Figure 16:
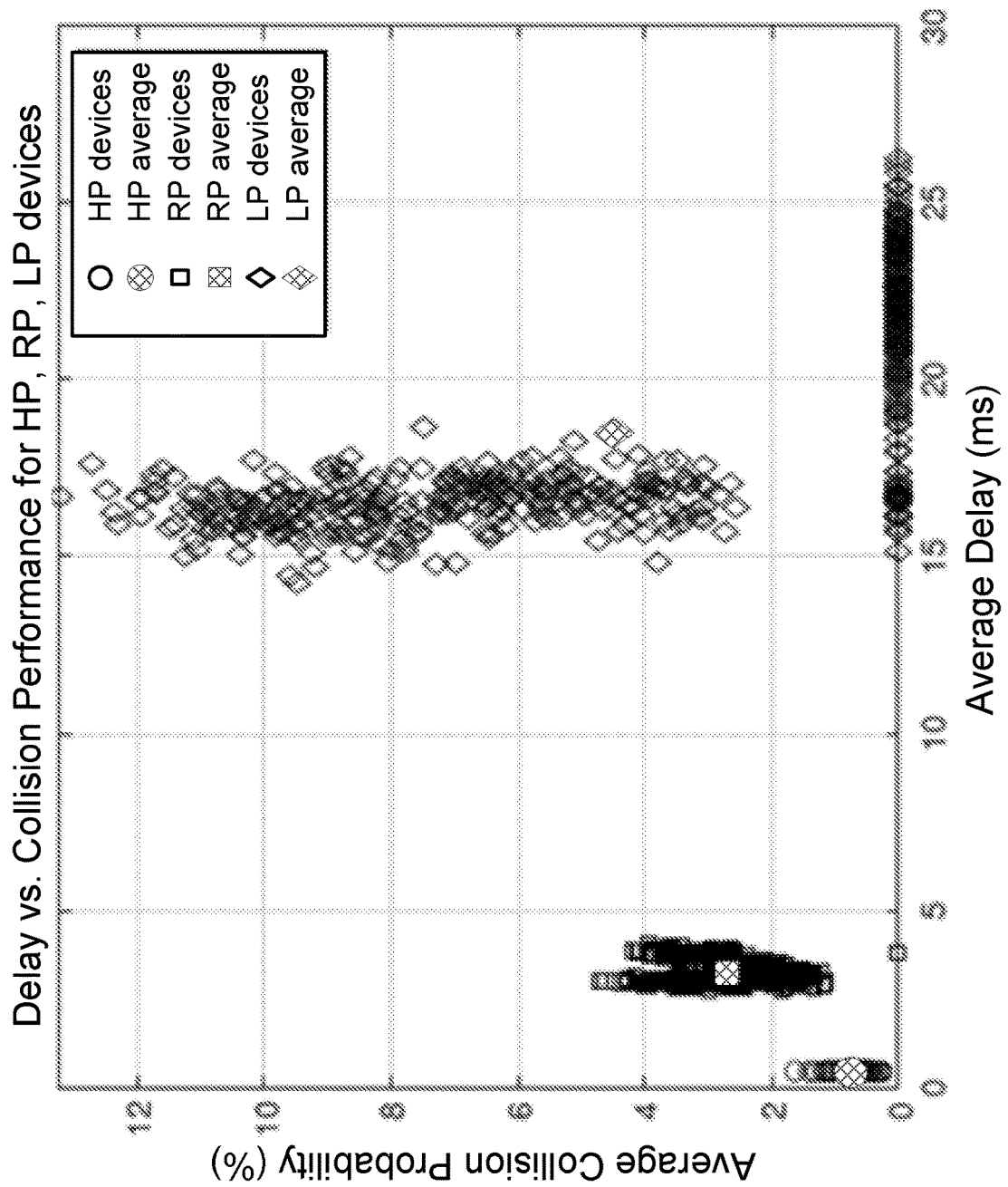

Differentiated performance are achieved for HP, RP, and LP devices in both FIG. 15 and FIG. 16. FIG. 15 illustrates performance for longer cycles and Poisson arrivals, while FIG. 16 illustrates performance for shorter cycles and Poisson arrivals. Specifically, the results are:

For HP devices: average delay 0.45 ms, maximum delay 0.46 ms, average collision probability 0.76%, and maximum collision probability 1.33% in FIG. 15. Average delay 0.45 ms, maximum delay 0.47 ms, average collision probability 0.72%, and maximum collision probability 1.62% in FIG. 16. For RP devices: average delay 3.3 ms, maximum delay 4.1 ms, average collision probability 2.65%, and maximum collision probability 5.08% in FIG. 15 average delay 3.3 ms, maximum delay 4 ms, average collision probability 2.69%, and maximum collision probability 4.71% in FIG. 16. For LP devices: average delay 29 ms, maximum delay 41 ms, average collision probability 0%, and maximum collision probability 0% in FIG. 15; average delay 19 ms, maximum delay 26 ms, average collision probability 4.47%, and maximum collision probability 13.22% in FIG. 16.

It is noted, with respect to FIG. 15, that, with longer LP cycle length, the probability of a LP device having a packet to send in its scheduled slot increases. Therefore the AP may be required to schedule mini slot to LP devices exclusively in order to avoid violating the LP packet collision probability constraint.

Figure 17:
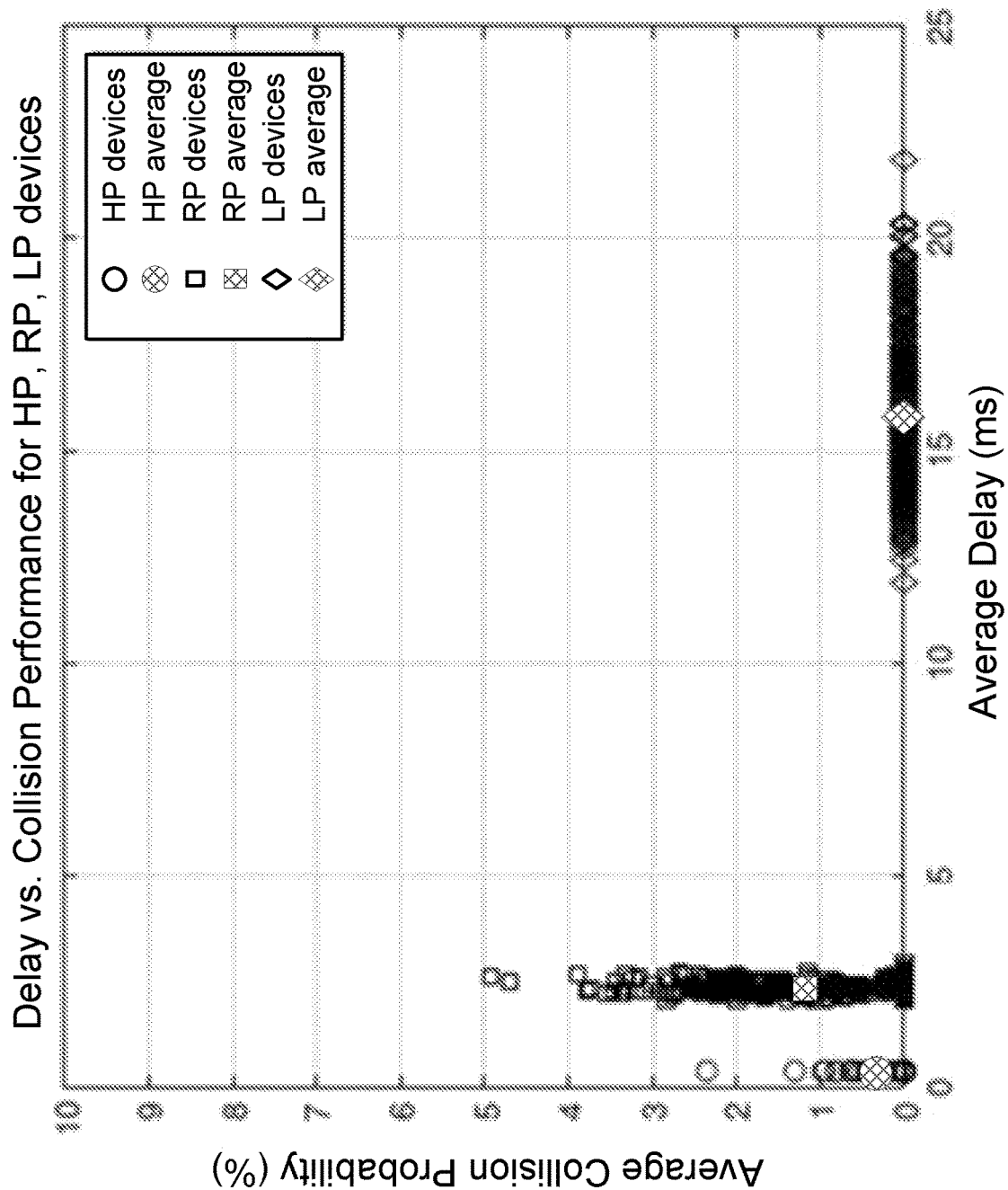
Figure 18:
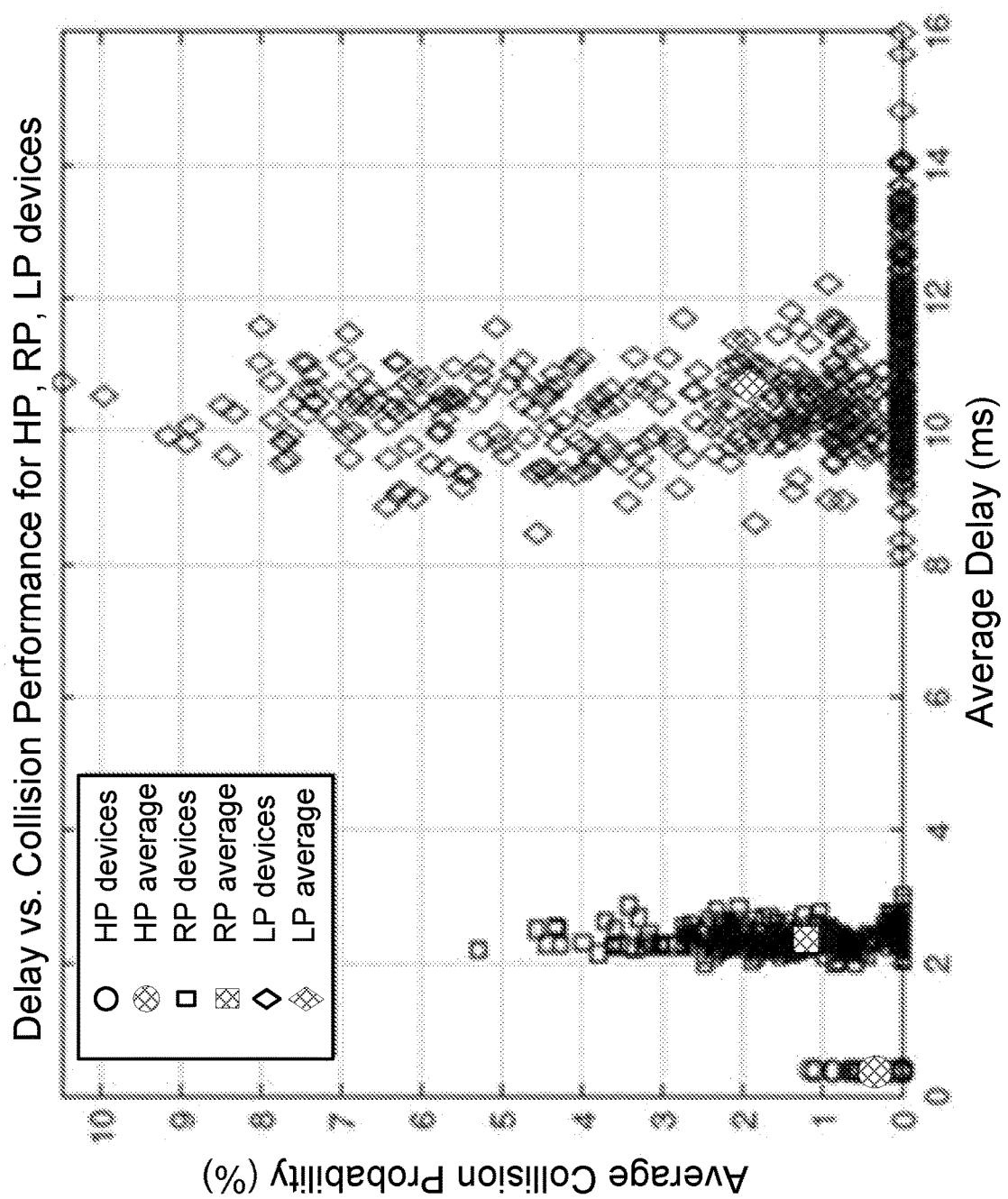

Next, the simulation results for mixed data traffic arrival patterns is presented. In this example, the same settings as those corresponding to FIG. 15 and FIG. 16 are used. However, 50% of devices, selected at random, have their packet arrival set to be periodic instead of Poisson. In addition, some noise is added to the periodic packet arrival by adding a random value within 5% of the length of the packet arrival interval to each packet arrival instant. Two results, with the same difference as in the cases of FIG. 15 and FIG. 16, are shown in FIG. 17 and FIG. 18. Two observations can be made from the results. First, having mixed data traffic arrival with both Poisson and periodic only has limited impact to the resulting protocol performance. This may be because the design is based on the average packet arrival rate without assuming particular traffic arrival patterns. Second, with half of the devices having periodic packet arrival, the performance of the proposed MAC in the simulation improves as compared to FIGS. 15 and 16. This may be because the probability of a device buffering a packet could reduce in the case of periodic packet arrival. As the proposed MAC is scheduling based, a buffered packet would experience a long delay. Therefore, with less buffered packets, the delay reduces and so does the collision probability. The difference is particularly evident for RP devices which has a long assignment cycle. The above results show that our design is not limited to Poisson packet arrival. Moreover, the performance of the proposed MAC could be further improved by exploiting the knowledge of the packet arrival pattern for devices with periodic traffic.

The above-described operation of the apparatus may be performed by one or more functional modules, which include at least the processor, network interface and memory operating in concert in a particular manner.

Figure 19:
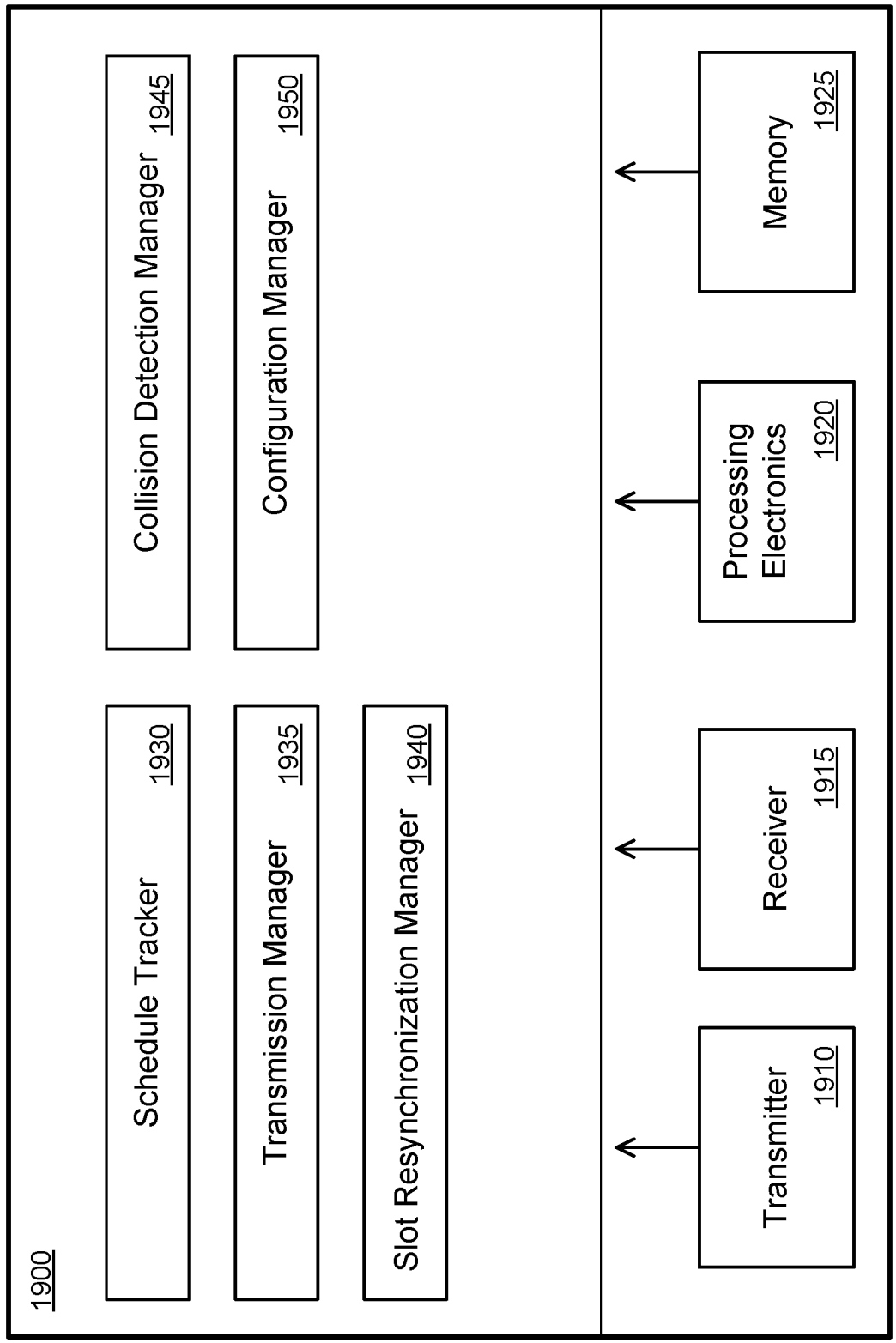
FIG. 19 illustrates an end device provided in accordance with some embodiments of the present invention.

FIG. 19 illustrates a device 1900, such as a wireless industrial IoT device, UE, MTC device, or other device, according to an embodiment of the present invention. The device includes a transmitter 1910, a receiver 1915, processing electronics 1920 and a memory 1925. The transmitter and receiver may be integrated together as a half-duplex or full-duplex transceiver. The processing electronics can include a computer processor executing instructions stored in memory, other electronics hardware such as application specific integrated circuits, field programmable gate arrays, digital electronics, analog electronics, or a combination thereof. The device is configured, for example by configuration of the processing electronics and memory, to implement one or more functions described as follows. Different functions or combinations of functions can be provided for, depending on the embodiment being implemented.

The device includes a schedule tracker 1930 which is configured to receive and process scheduling messages from the access point. The scheduling messages indicate transmission opportunities, such as combinations of slots and mini slots, in which the device is to perform transmissions. When a transmission opportunity occurs and the device is to use the transmission opportunity (e.g. by virtue of the device having a packet to send), the schedule tracker initiates the device to attempt a transmission. The device includes a transmission manager 1935. The transmission manager is configured to transmit beginning in a first mini slot of a designated slot corresponding to a transmission opportunity, when the transmission opportunity designates the first mini slot. The transmission manager is further configured to attempt transmission by transmitting beginning in a mini slot other than the first mini slot of a designated slot, when the transmission opportunity designates such a mini slot, and when the shared channel is determined to be idle during the mini slot prior to the designated mini slot. The device may further include a slot resynchronization manager 1940. The slot resynchronization manager is configured to monitor, at a time prior to a scheduled end of a time slot (and typically all time slots), for an indication that the time slot or the other time slot is idle. When the time slot or the other time slot is idle, the slot resynchronization manager is configured to begin an immediately next time slot at a particular time prior to the scheduled end. The device may further include a collision detection manager 1945, which is configured, following a transmission, to monitor for an indication that the transmission resulted in a collision. The collision detection manager may further be configured to trigger retransmission upon detection of a collision. The device may further include a configuration manager 1950, which is configured to monitor for system information messages, and to adjust its own configuration and operation based on contents of the system information messages.

Figure 20:
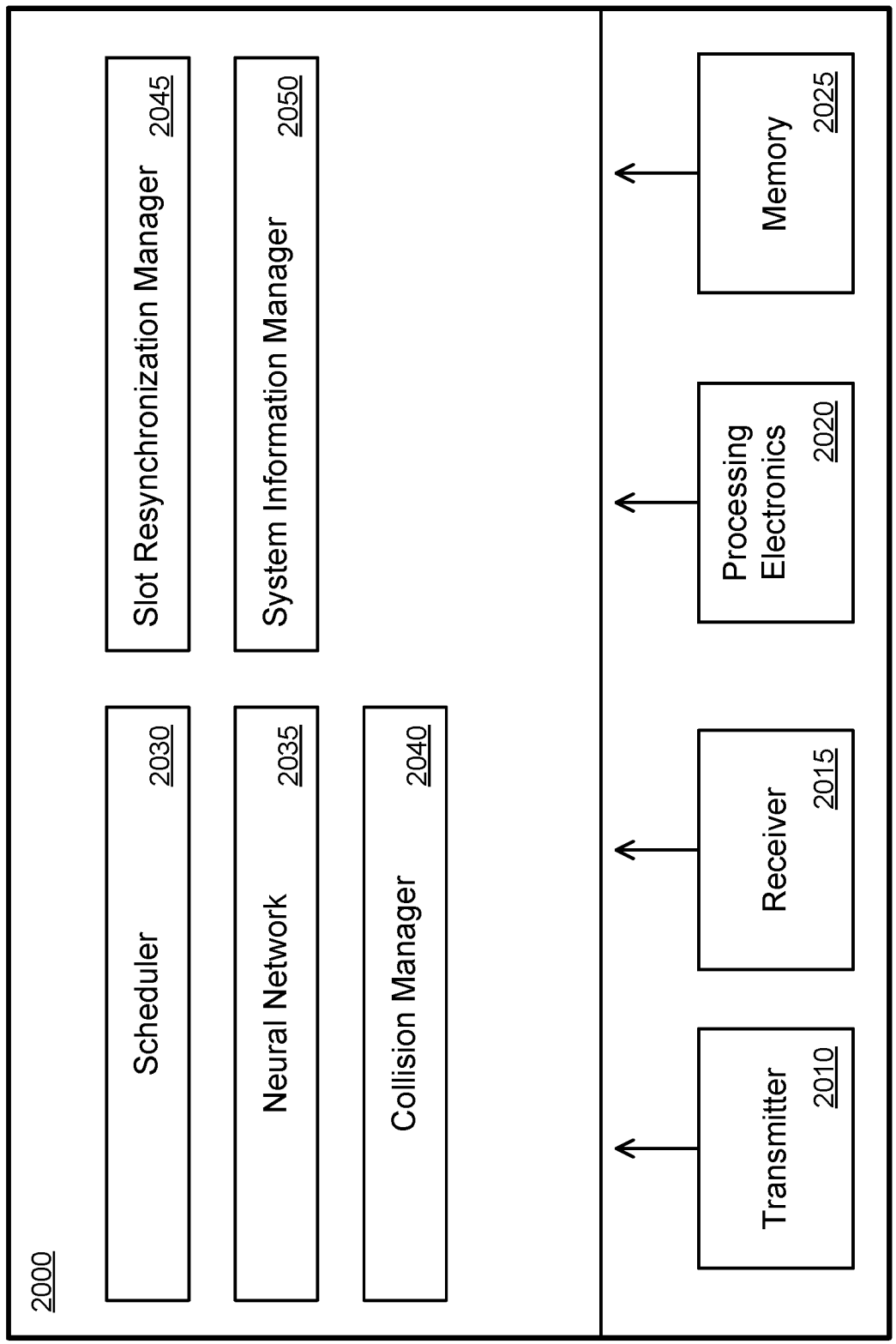
FIG. 20 illustrates an access point provided in accordance with some embodiments of the present invention.

FIG. 20 illustrates an access point 2000, such as a wireless access point or base station, according to an embodiment of the present invention. The access point includes a transmitter 2010, a receiver 2015, processing electronics 2020 and a memory 2025. The transmitter and receiver may be integrated together as a half-duplex or full-duplex transceiver. The processing electronics can include a computer processor executing instructions stored in memory, other electronics hardware such as application specific integrated circuits, field programmable gate arrays, digital electronics, analog electronics, or a combination thereof. The access point is configured, for example by configuration of the processing electronics and memory, to implement one or more functions described as follows. Different functions or combinations of functions can be provided for, depending on the embodiment being implemented.

The access point includes a scheduler 2030 configured to determine individual schedules for individual devices, a master schedule for all devices, or a combination thereof. The schedule indicates transmission opportunities consisting of slots and mini slots. The schedule can be generated based on a variety of information, such as device requirements or prioritization information, general system requirements, device transmission history, etc. The schedule initiates communication of the schedule to devices via one or more scheduling messages via the transmitter. The scheduler can be operatively coupled to a neural network 2035 which is configured to assist with generating the schedule or other operating parameters. The access point further includes a transmission monitor 2035 which is configured to monitor, via the receiver, for and receive transmissions from devices, where those transmissions are performed in accordance with a schedule. The access point may include a collision manager 2040 which is configured to monitor for collisions on the shared channel and to transmit a collision indication upon detecting such collisions. The access point may include a slot resynchronization manager 2045 which operates similarly to the slot resynchronization manager 1940 of the device 1900. The access point may include a system information manager 2050 which is configured to configure and provide, via the transmitter, system information messages indicative of the current operating configuration parameters for at least the MAC communication protocol being implemented.

Various methods as disclosed herein may be implemented on one or more real or virtual computing devices, such as devices within a communication network control plane, devices operating in a communication network data plane, or a combination thereof. Computing devices used to implement operations as described herein may include a processor operatively coupled to memory, the memory providing instructions for execution by the processor to perform a method as described herein.

Various embodiments of the present invention utilize real and/or virtual computer resources. Such computer resources utilize, at a hardware level, a set of one or more processors operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources and memory, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. The software product may additionally or alternatively include number of instructions that enable a computer device to execute operations for configuring or programming a digital logic apparatus in accordance with embodiments of the present invention.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A device in a communication network, the device comprising a transmitter, a receiver and controlling electronics and configured to:
   receive a schedule indicating a transmission opportunity on a shared channel for the device, the transmission opportunity corresponding to a mini slot forming part of a time slot, the mini slot and the time slot specified by the schedule;
   when the device is to use the transmission opportunity to transmit data, performing following actions:
   if the specified mini slot is a first mini slot of all mini slots in the specified time slot, transmit the data using the shared channel; and
   if the specified mini slot is after the first mini slot:
      monitor a prior mini slot which is part of the time slot and which precedes the specified mini slot; and
      transmit the data using the shared channel upon detecting that the shared channel is idle during said prior mini slot, and refraining from transmitting the data at the transmission opportunity otherwise.

2. The device of claim 1, further configured to: monitor, at a time prior to a scheduled end of the time slot or another time slot, for an indication that the time slot or the other time slot is idle, and when the time slot or the other time slot is idle, begin an immediately next time slot at a particular time prior to the scheduled end.

3. The device of claim 2, wherein monitoring for the indication comprises monitoring for a signal transmitted by an access point and indicative that the time slot or the other time slot is idle.

4. The device of claim 2, wherein monitoring for the indication comprises monitoring a last mini slot within the time slot or the other time slot, and determining that the time slot or the other time slot is idle upon detecting that the shared channel is idle during the last mini slot.

5. The device of claim 1, further configured, upon or after transmission of the data using the shared channel, to:
monitor a portion of the specified time slot for a collision indication transmitted by an access point; and
upon detecting the collision indication, determine that the transmission of the data is unsuccessful.

6. The device of claim 5, further comprising retransmitting the data in a subsequent scheduled time slot following said determining that the transmission of the data is unsuccessful.

7. The device of claim 5, wherein an end of said transmission of the data occurs before an end of the specified time slot, and wherein said portion of the specified time slot follows the end of said transmission of the data.

8. The device of claim 1, wherein an end of said transmission of the data occurs at or before an end of the specified time slot.

9. The device of claim 1, wherein the prior mini slot immediately precedes the mini slot.

10. The device of claim 1, wherein the schedule is received from an access point configured to schedule transmission opportunities for a plurality of devices, each transmission opportunity comprising an indication of a corresponding time slot and a corresponding mini slot forming part of the corresponding time slot.

11. The device of claim 1, further configured to monitor for a system information message, and adjust transmission operation according to contents of the system information message, wherein said adjusting transmission operation includes one or more of:
when the system information message indicates that idle time slots are truncated, monitoring, at a time prior to a scheduled end of the time slot or another time slot, for an indication that the time slot or the other time slot is idle, and when the time slot or the other time slot is idle, begin an immediately next time slot at a particular time prior to the scheduled end; and
when the system information message indicates that a same mini slot of a same time slot is potentially designated as a transmission opportunity for at least two different devices including the device, and when the device uses said transmission opportunity, monitoring for a collision indication following said use of said transmission opportunity.

12. A method for medium access control, the method comprising, by a device in a communication network:
receiving a schedule indicating a transmission opportunity on a shared channel for the device, the transmission opportunity corresponding to a mini slot forming part of a time slot, the mini slot and the time slot specified by the schedule;
when the device is to use the transmission opportunity to transmit data, performing following actions:
if the specified mini slot is a first mini slot of all mini slots in the specified time slot, transmitting the data using the shared channel; and
if the specified mini slot is after the first mini slot:
monitoring a prior mini slot which is part of the time slot and which precedes the specified mini slot; and
transmitting the data using the shared channel upon detecting that the shared channel is idle during said prior mini slot, and refraining from transmitting the data at the transmission opportunity otherwise.

13. The method of claim 12, wherein the schedule is received from an access point, the method further comprising, by the access point:
transmitting, via one or more scheduling messages, one or more schedules indicating a plurality of uplink transmission opportunities, including said transmission opportunity, on the shared channel for a plurality of respective devices, including said device, each transmission opportunity of the plurality corresponding to a respective time slot and a respective mini slot forming part of said respective time slot; and
monitoring the shared channel for transmissions from the plurality of devices according to the one or more schedules, each of the plurality of devices configured to use or refrain from using each transmission opportunity assigned thereto based at least in part on an internal condition, each of the transmissions beginning in a particular mini slot and spanning multiple mini slots.

14. The method of claim 13, wherein the one or more schedules indicates: a first transmission opportunity beginning in one particular mini slot of the particular time slot; and a second transmission opportunity beginning in a another particular mini slot of the particular time slot, said other particular mini slot being subsequent to said one particular mini slot, and wherein the method further comprises, by the access point:
monitoring for a first transmission according to the first transmission opportunity;
when the first transmission does not occur, monitoring for a second transmission according to the second transmission opportunity; and
when the first transmission occurs, refraining from monitoring for the second transmission.

15. The method of claim 13, further comprising, by the access point:
monitoring, at a time prior to a scheduled end of the particular time slot or another time slot, for an indication that the particular time slot or the other time slot is idle, and when the particular time slot or the other time slot is idle, beginning an immediately next time slot at a particular time prior to the scheduled end; and
when the particular time slot or the other time slot is idle, transmitting a signal indicative that the time slot or the other time slot is idle, said signal usable by the plurality of respective devices to begin the immediately next time slot at the particular time.

16. The method of claim 13, further comprising, by the access point:
monitoring, at a time prior to a scheduled end of the particular time slot or another time slot, for an indication that the particular time slot or the other time slot is idle, and when the particular time slot or the other time slot is idle, beginning an immediately next time slot at a particular time prior to the scheduled end;
including, in the one or more schedules, at least a first transmission opportunity for a first one of the plurality of devices and a second transmission opportunity for a second, different one of the plurality of devices, wherein both of said first transmission opportunity and said second transmission opportunity indicate a same respective time slot and a same respective mini slot; and monitoring for a collision among said at least two transmission opportunities, and transmitting a collision indication upon detecting said collision, said collision indication occurring in said same respective time slot of said at least two transmission opportunities.

17. The method of claim 13, further comprising, by the access point:

monitoring, at a time prior to a scheduled end of the particular time slot or another time slot, for an indication that the particular time slot or the other time slot is idle, and when the particular time slot or the other time slot is idle, beginning an immediately next time slot at a particular time prior to the scheduled end;

including, in the one or more schedules, at least a first transmission opportunity for a first one of the plurality of devices and a second transmission opportunity for a second, different one of the plurality of devices, wherein both of said first transmission opportunity and said second transmission opportunity indicate a same respective time slot and a same respective mini slot; and transmitting a system information message for use by the plurality of respective devices, wherein the system information includes one or more of:

an indication that idle time slots are truncated; and an indication that a same mini slot of a same time slot is potentially designated as a transmission opportunity for at least two different devices.

18. The method of claim 12, further comprising: monitoring, at a time prior to a scheduled end of the time slot or another time slot, for an indication that the time slot or the other time slot is idle, and when the time slot or the other time slot is idle, beginning an immediately next time slot at a particular time prior to the scheduled end, wherein monitoring for the indication comprises monitoring for a signal transmitted by an access point and indicative that the time slot or the other time slot is idle.

19. The method of claim 12, further comprising, upon or after transmission of the data using the shared channel:

monitoring a portion of the specified time slot for a collision indication transmitted by an access point; and upon detecting the collision indication, determining that the transmission of the data is unsuccessful.

20. The method of claim 12, further comprising monitoring for a system information message, and adjusting transmission operation according to contents of the system information message, wherein said adjusting transmission operation includes one or more of:

when the system information message indicates that idle time slots are truncated, monitoring, at a time prior to a scheduled end of the time slot or another time slot, for an indication that the time slot or the other time slot is idle, and when the time slot or the other time slot is idle, begin an immediately next time slot at a particular time prior to the scheduled end; and when the system information message indicates that a same mini slot of a same time slot is potentially designated as a transmission opportunity for at least two different devices including the device, and when the device uses said transmission opportunity, monitoring for a collision indication following said use of said transmission opportunity.

* * * * *